United States Patent [19]

Narayen et al.

[11] Patent Number: 6,035,323
[45] Date of Patent: Mar. 7, 2000

[54] METHODS AND APPARATUSES FOR DISTRIBUTING A COLLECTION OF DIGITAL MEDIA OVER A NETWORK WITH AUTOMATIC GENERATION OF PRESENTABLE MEDIA

[75] Inventors: Shantanu Narayen, Sunnyvale; Wu Wang, Los Altos; Steve Morris, Palo Alto; Chan Chiu, Sunnyvale; Cecilia Zhao, Newark; Aditya Khosla, Mountain View; James Lei, Cupertino; Prasad Kongara, San Jose, all of Calif.

[73] Assignee: Pictra, Inc., Sunnyvale, Calif.

[21] Appl. No.: 08/957,224

[22] Filed: Oct. 24, 1997

[51] Int. Cl.[7] .................................................. G06F 13/00
[52] U.S. Cl. ........................... 709/201; 709/232; 709/246; 707/501
[58] Field of Search ................................... 709/200, 201, 709/231, 232, 246; 707/501

[56] References Cited

U.S. PATENT DOCUMENTS

| | | |
|---|---|---|
| 5,608,874 | 3/1997 | Ogawa et al. . |
| 5,706,502 | 1/1998 | Foley et al. . |
| 5,710,883 | 1/1998 | Honz et al. . |
| 5,715,397 | 2/1998 | Ogawa et al. . |
| 5,745,360 | 4/1998 | Leone et al. . |
| 5,752,022 | 5/1998 | Chiu et al. . |
| 5,778,367 | 7/1998 | Wesinger et al. ......................... 707/10 |
| 5,802,299 | 9/1998 | Logan et al. ............................. 709/218 |
| 5,841,432 | 11/1998 | Carmel et al. .......................... 345/302 |
| 5,845,084 | 12/1998 | Cordell et al. .......................... 709/234 |
| 5,862,346 | 1/1999 | Kley et al. .............................. 709/243 |
| 5,870,552 | 2/1999 | Dozier et al. ........................... 709/219 |
| 5,890,170 | 3/1999 | Sidana .................................... 707/501 |
| 5,892,909 | 4/1999 | Grasso et al. ........................... 709/201 |

*Primary Examiner*—Krisna Lim
*Attorney, Agent, or Firm*—Blakely, Sokoloff, Taylor & Zafman

[57] ABSTRACT

Methods and apparatuses for publishing a collection of digital media on a network. In one example of a method, a client digital processing system generates a collection of digital media and transmits collection information, which describes the collection of digital media, to a server digital processing system. From the collection information, a plurality of presentable media is automatically generated; each of these presentable media is capable of being presented to other client digital processing systems which are coupled to the network. In this one example, the network is operating according to a hypertext transfer protocol. In this one example, the client and server systems are programmed to interact together such that the presentable media is automatically generated.

38 Claims, 21 Drawing Sheets

METHODS AND APPARATUSES FOR DISTRIBUTING A COLLECTION OF DIGITAL MEDIA OVER A NETWORK WITH AUTOMATIC GENERATION OF PRESENTABLE MEDIA

FIELD OF THE INVENTION

The present invention relates to methods and apparatuses for distributing digital media over a network. Particularly, the present invention relates to methods and apparatuses for publishing digital images over a network operating according to Internet or intranet protocols.

BACKGROUND OF THE INVENTION

Digital processing systems, such as conventional computer systems, often can accept input from a digital acquisition device, such as a digital camera or a scanner. Examples of digital cameras and scanners are well known in the art. These devices may be used to capture an image, such as a picture of a person, and then the image may be input into a computer system. For example, the output of a digital camera may be input to a computer system which is executing a digital photography software program, such as Photoshop from Adobe Systems, Inc. of San Jose, Calif. Once the digital image is inputted into the computer system, it is stored on a computer readable storage medium, such as a hard disk, a floppy disk, an optical disk, or other well known computer readable storage media. The storage of the media on the computer readable storage media is controlled by a file management system which is usually considered to be a disk operating system software which is also running on the computer system. Thus, the result of the conventional digital photography software is the storage of a file which contains the content of the digital picture on a computer readable medium which is controlled by the file management system of the computer system.

The user can then modify the image, print the image, and perform other operations with the image. One such operation is the distribution or publication of the image over a network, such as the World Wide Web or the Internet.

FIG. 1 shows a process in the prior art which typically requires at least two software programs at the computer system which first acquires the digital image. In particular, a digital photography computer program is typically required to capture the image from a digital camera or from a scanner, and a separate web authoring computer program, such as Front Page '97 from Microsoft Corporation of Redmond, Wash. is also required. In addition, the web authoring software (or some other software) must transfer the files and images to an Internet service provider which then must link the files and images and maintain the HTML (hypertext markup language) formatted documents at a web server.

FIG. 1 shows the various steps required in this complicated procedure in order to make digital images available for viewing over the Internet to web browsers. The method starts by acquiring in step 10 an image from a digital camera. This acquisition typically occurs by a digital photography program, such as Adobe's Photoshop, which receives the input from the digital camera and causes the inputted image to be saved in the file management system of the computer system. Then in step 12, a separate computer program, such as a web authoring software program creates HTML files. These files may have insertion points for various digital images, such as those acquired from a digital camera in step 10. Then in step 14, the web authoring software, such as Microsoft's Front Page '97, transfers the HTML files and also separately transfers the digital images stored in step 10 to an Internet service provider. Typically the files are transferred according to the FTP protocol. In step 16, the Internet service provider links the HTML files and the appropriate images and maintains persistently the HTML pages from the files and images on a web server, and this allows web browsers to view the HTML pages from the web server provided by the Internet service provider (ISP)

The foregoing procedure is relatively complicated, requires the user of the digital camera to have some familiarity with HTML document creation, and also requires the use of at least two separate programs on of the computer system which receives the input from the digital camera. Furthermore, the Internet service provider must perform the linking operation in order to maintain HTML pages which present the images to web browsers over the Internet.

While it is possible to use e-mail computer programs or public bulletin board services to attempt to distribute digital media over a network, such programs or systems are not designed to provide for the generation of a collection of digital media and then the transmission of the collection and then the automatic generation from the collection of viewable media. Also, certain organizations, such as real estate realtors have attempted to distribute digital media over the Internet. However, this distribution is believed to be as complicated as the method shown in FIG. 1.

Given the complexity of the foregoing tasks, it is desirable to allow a user of a digital camera to easily distribute or publish images from the digital camera or other digital acquisition devices over a network, such as the Internet.

SUMMARY OF THE INVENTION

The present invention discloses methods and apparatuses for distributing a collection of digital media on a network. A method in one example of the invention generates a collection of digital media at a client digital processing system. Then collection information is transmitted from the client digital processing system to a server digital processing system. The collection information describes the collection of digital media. A plurality of presentable media is then automatically generated from the collection information. Each of the plurality of presentable media is capable of being presented to other client digital processing systems which are coupled to a network. Typically this network is operating according to the hypertext transfer protocol (HTTP) and both the client and the server system are coupled to this network. In one particular example of the present invention, the digital media includes digital images and the presentable media includes viewable images. Further, the client digital processing system and the server digital processing system are each programmed to interact together such that the server digital processing system generates automatically, from the collection information, the plurality of viewable images.

Computer systems which practice the methods of the invention are also described. Further, computer readable media having software which allows the computer systems to perform the methods of the present invention are described.

DETAILED DESCRIPTION

Figure 1:
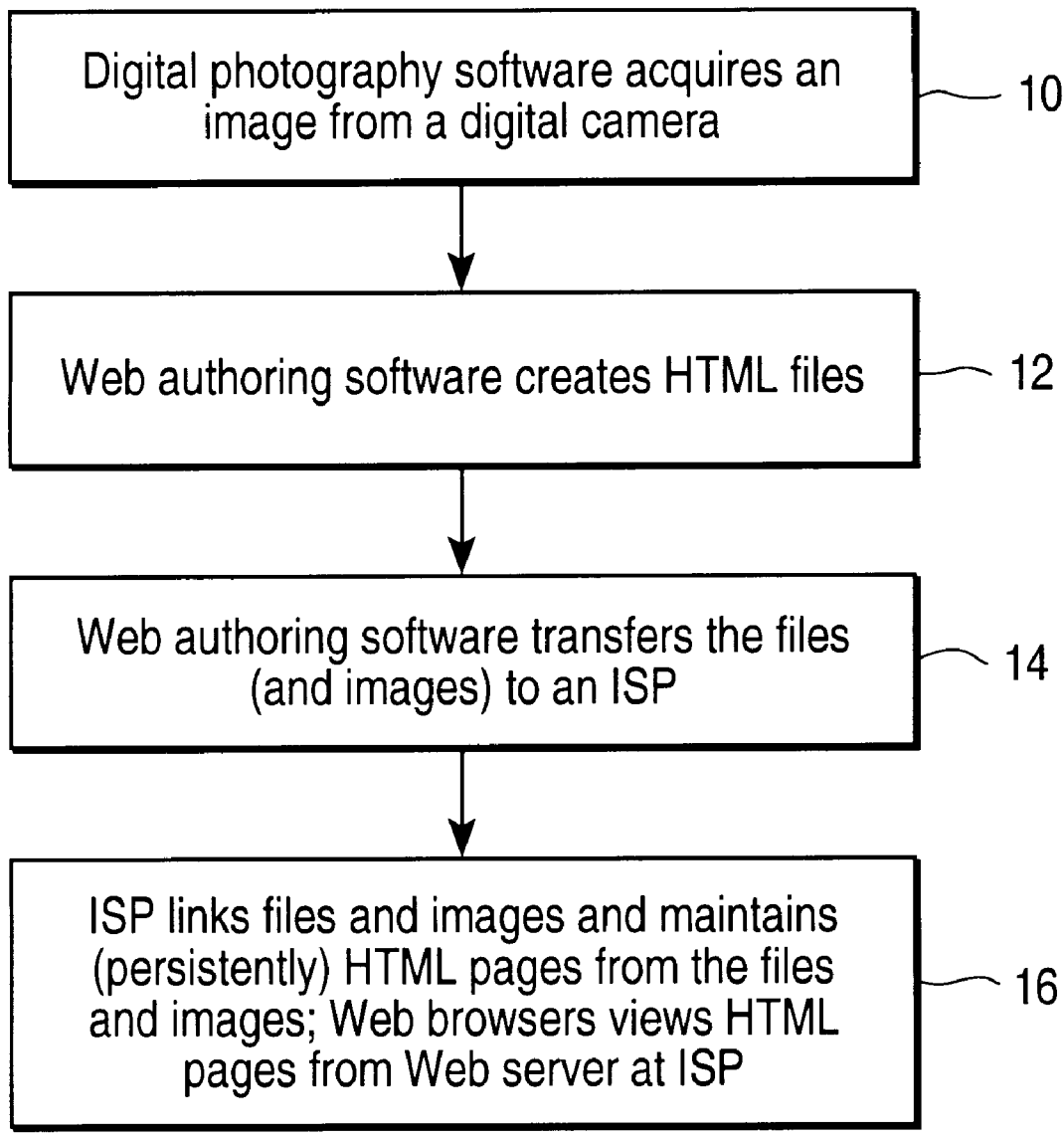
FIG. 1 shows a method according to the prior art of distributing a digital image from a digital camera such that users of web browsers may view the image.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © Pictra, Inc. 1997.

Figure 2:
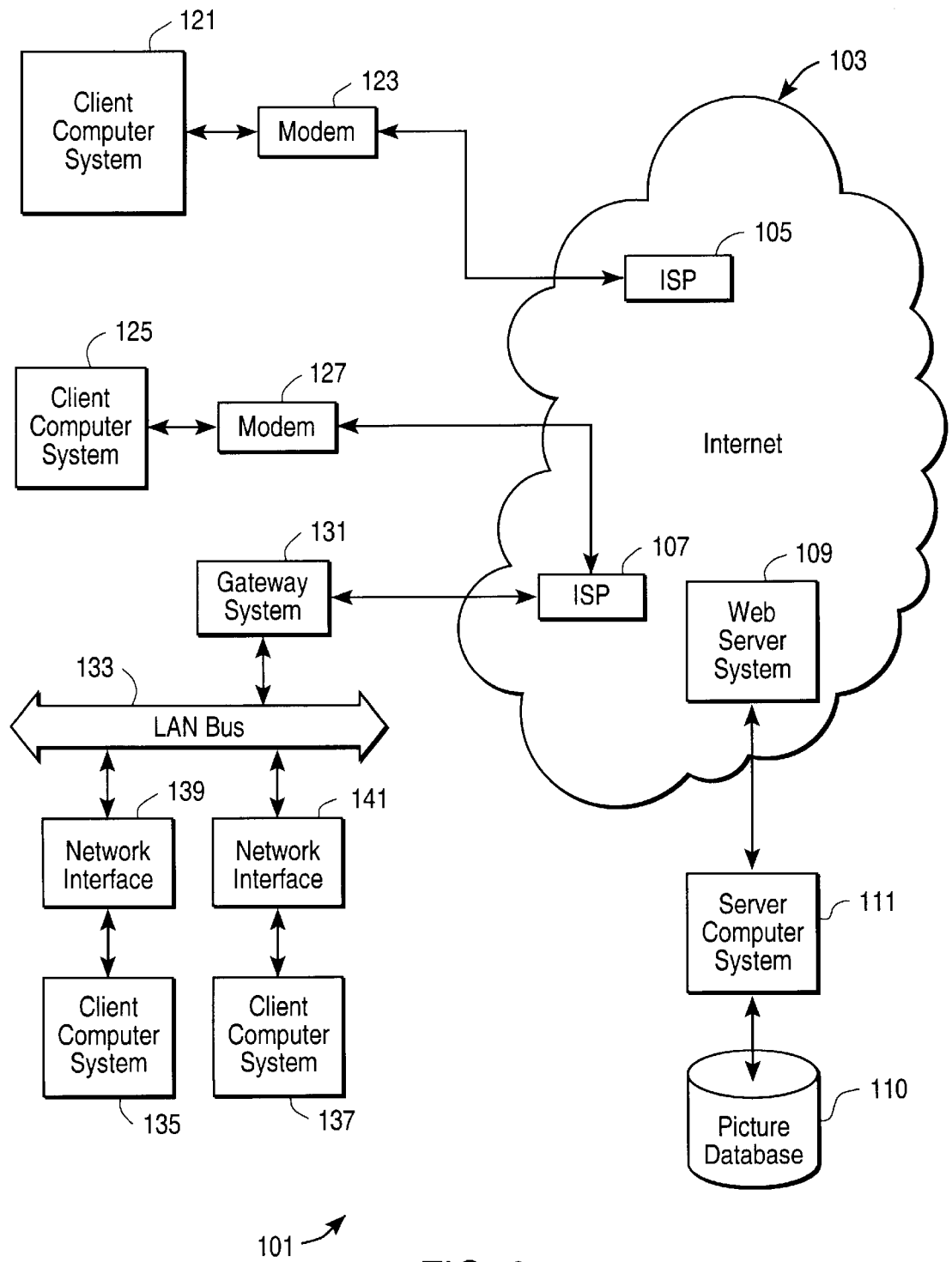
FIG. 2 shows an example of several client computer systems coupled to the Internet and a server computer system with a picture database or a database of other digital media according to one embodiment of the present invention.

FIG. 2 shows several computer systems which are coupled together through the Internet 103. It will be appreciated herein that the term "Internet" refers to a network of networks which uses certain protocols (e.g. the TCP/IP protocol, and possibly other protocols such as the HTTP (hypertext transfer protocol) for HTML (hypertext markup language) documents). The physical connections of the Internet and the protocols and communication procedures of the Internet are well known to those in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML format. These documents are often provided by web servers, such as web server 109 which is considered to be "on" the Internet. Often these web servers are provided by the ISPs, such as ISP 105, although a computer system may be set up and connected to the Internet without that system being also an ISP as is well known in the art.

The web server 109 is typically at least one computer system which operates as a server computer system and is configured to operate with the protocols of the World Wide Web (WWW) and is coupled to the Internet. Optionally, the web server 109 may be part of an ISP which provides access to the Internet for client systems. The web server 109 is shown coupled to the server computer system 111 which itself is coupled to a picture database 110, which may be considered a form of a media database. It will be appreciated that while two computer systems 109 and 111 are shown in FIG. 2, the web server system 109 and the server computer system 111 may be one computer system having different software components providing the web server functionality and the server functionality provided by the server computer system 111 which will be described further below. Client computer systems 121, 125, 135, and 137 may each, with the appropriate web browsing software, view HTML pages provided by the web server 109. The ISP 105 provides Internet connectivity to the client computer system 121 through the modem interface 123 which may be considered part of the client computer system 121. The client computer system may be a "WINTEL" computer system, a network computer, a Web TV system, or other computer systems. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a local area network (LAN). While FIG. 2 shows the interfaces 123 and 127 as a "modem," it will be appreciated that each of these interfaces may be an analog modem, ISDN modem, cable modem, satellite transmission interface (e.g. "Direct PC"), or other interfaces for coupling a computer system to other computer systems. Client computer systems 135 and 137 are coupled to a LAN bus 133 through network interfaces 139 and 141, which may be Ethernet network or other network interfaces. The LAN bus is also coupled to a gateway computer system 131 which may provide firewall and other Internet related services for the local area network. This gateway computer system 131 is coupled to the ISP 107 to provide Internet connectivity to the client computer systems 135 and 137. The gateway computer system 131 may be a conventional server computer system. Also, the web server system 109 may be a conventional server computer system.

Figure 3:
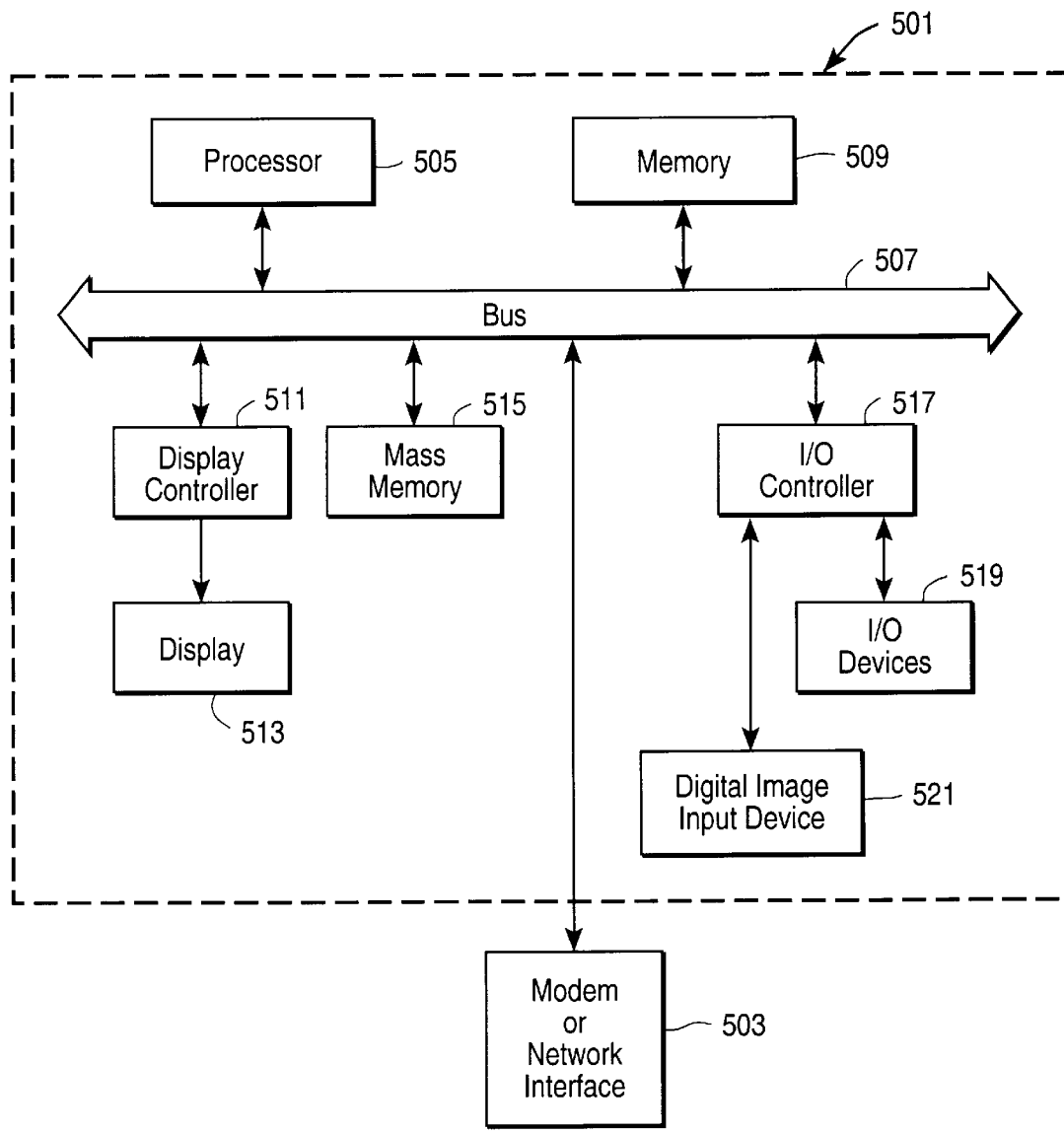
FIG. 3 shows an example of a computer system which may be used with the present invention.

FIG. 3 shows one example of a conventional server computer system which may be used as a client computer system or a server computer system or as a web server system. It will also be appreciated that such a computer system may be used to perform many of the functions of an Internet service provider, such as ISP 105. The computer system 501 interfaces to external systems through the modem or network interface 503. It will be appreciated that the modem or network interface 503 may be considered to be part of the computer system 501. This interface 503 may be an analog modem, ISDN modem, cable modem, token ring interface, satellite transmission interface (e.g. "Direct PC"), or other interfaces for coupling a computer system to other computer systems. The computer system 501 includes a processor 505, which may be a conventional microprocessor such as an Intel Pentium microprocessor or Motorola Power PC microprocessor. Memory 509 is coupled to the processor 505 by a bus 507. Memory 509 may be dynamic random access memory (DRAM) and may also include static RAM (SRAM). The bus 507 couples the processor 505 to the memory 509 and also to mass memory 515 and to display controller 511 and to the I/O (input/output) controller 517. The display controller 511 controls in the conventional manner a display on a display device 513 which may be a CRT or liquid crystal display. The input/output devices 519 may include a keyboard, disk drives, printers, a scanner, and other input and output devices, including a mouse or other pointing device. The display controller 511 and the I/O controller 517 may be implemented with conventional well known technology. A digital image input device 521 may be a digital camera which is coupled to an I/O controller 517 in order to allow images from the digital camera to be input into the computer system 501. The mass memory 515 is often a magnetic hard disk, an optical disk, or another form of storage for large amounts of data. Some of this data is often written, by a direct memory access process, into memory 509 during execution of software in the computer system 501. It will be appreciated that the computer system 501 is one example of many possible computer systems which have different architectures. For example, WINTEL systems (systems which run a Microsoft Windows operating system on an Intel microprocessor) often have multiple buses, one of which may be considered to be a peripheral bus. Network computers may also be considered to be a computer system which may be used with the present invention. Network computers may not include a hard disk or other mass storage, and the executable programs are loaded from a network connection into the memory 509 for execution by the processor 505. A Web TV system, which is known in the art, may be considered to be a computer system according to the present invention, but it may not include certain features shown in FIG. 3, such as certain input or output devices. A typical computer system will usually include at least a processor, memory, and a bus coupling the memory to the processor. It will also be appreciated that the computer system 501 is controlled by operating system software which includes a file management system, such as a disk operating system, which is part of the operating system software. One example of an operating system software with its associated file management system software is the operating system known as Windows '95 from Microsoft Corporation of Redmond, Wash., and its associated file management system, including Windows Explorer. The file management system is typically stored in the mass memory 515 and causes the processor 505 to execute the various steps required by the operating system to input and output data and to store data in memory, including storing files on the mass memory 515.

Figure 4:
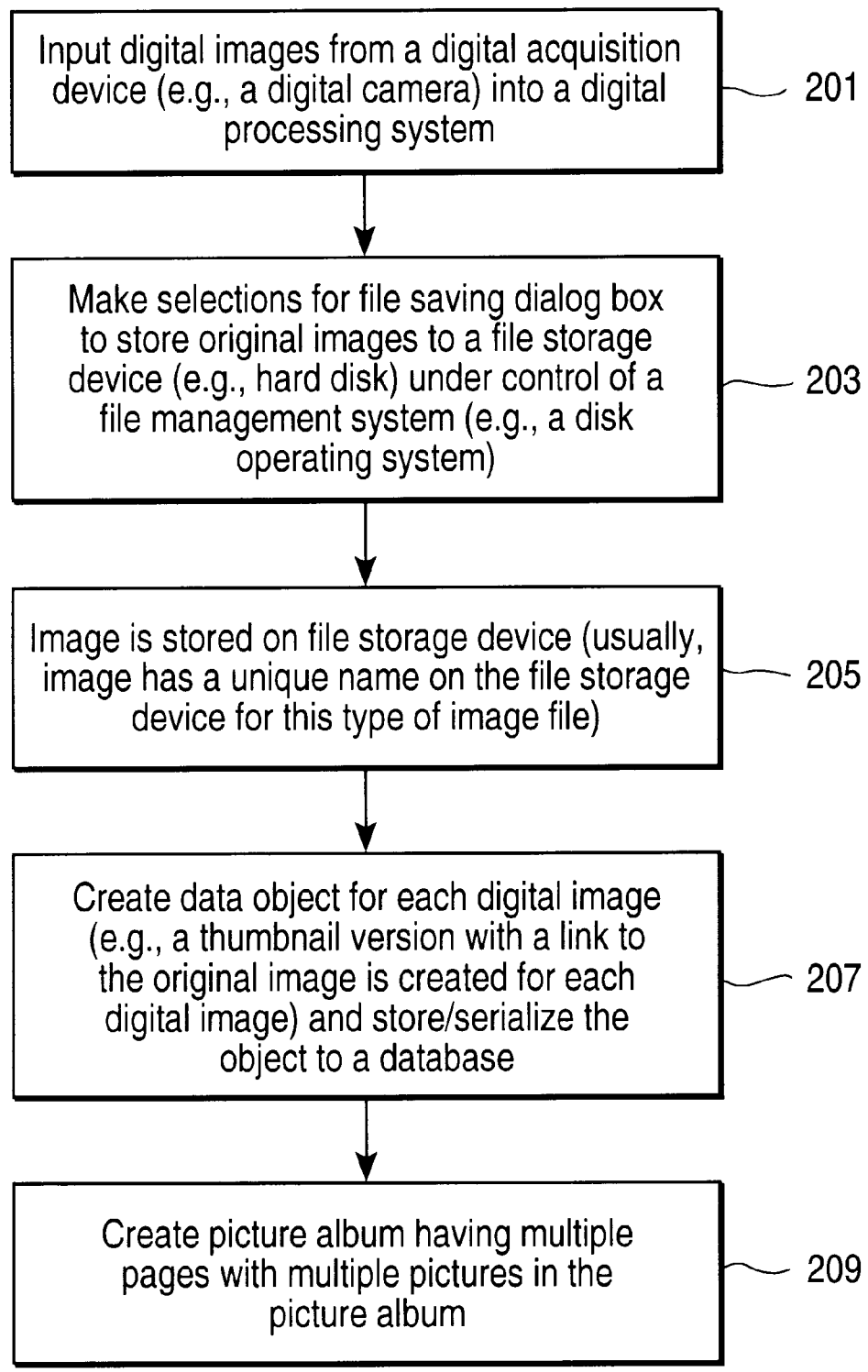
FIG. 4 shows a method for using a digital acquisition device to load pictures into a computer system according to one aspect of the present invention.

FIG. 4 will now be referred to to describe one aspect of the present invention which relates to methods and apparatuses for acquiring a digital image for use in a digital processing system, such as a computer system. The method of FIG. 4 begins in step 201 in which a user inputs digital images from a digital acquisition device, such as a digital camera into a digital processing system. For purposes of explanation, this description often uses the term "digital camera" rather than the term "digital acquisition device." It will be understood that "digital camera" is being used as a shorthand phrase to refer to the general group of digital acquisition devices, and that a digital camera is an example of a digital acquisition device. In step 203, the user makes selections in a file saving dialog box presented to the user on a display of the computer system in order to store the original images to the file storage device, such as a hard disk. The storage occurs under the control of a file management system such as a disk operating system. The storage is performed in step 205 and typically the image has a unique name on the file storage device or at least a unique full path name for this type of image file. Then according to the present invention, in step 207 a data object is created for each digital image and is stored in a database. This storage is in addition to the storage of the original file for the original image on a file storage device. The storage in the database typically is performed by a picture management system which is typically a separate piece of software which creates and stores the data object for each digital image and also which maintains the database. In one particular embodiment, a lower resolution version of a digital image, such as a "thumbnail" version is stored in the database along with a link to the original image stored on the file storage device under control of the file management system (in step 203). The link which is stored in association with the thumbnail version refers back to the original image by identifying the picture title or caption as well as the full path name of the original image stored on the file storage device in step 203. Examples of the thumbnail versions or representations of the original digital image are provided below in this discussion. In step 209, the user of the computer system then may create a picture album or another type of media container using a media authoring program of the invention. In one embodiment, the picture album has multiple pages with multiple pictures in the picture album. It will be appreciated that the term digital media includes digital images, such as digital pictures imported or acquired from a digital camera as well as audio files and video files (e.g. Quicktime files) and other digital documents such as word processing files. Thus, a digital picture is a form of a digital media. Similarly, media container is a general term which includes a picture album, but a media container may also include and contain other types of media including audio files or video files or software files such as word processing document files.

In one aspect of the present invention, step 209 of FIG. 4 may be performed substantially automatically under the control of the picture management system which guides a user step by step in a predetermined fashion through a series of questions or steps such that the user is driven from the capture process in step 201 to a publishing process which is described further below. Thus, the user is driven step by step through the capture process of step 201 and the creation of a picture album by selecting a layout and the pictures for the album and then the picture management system transmits the necessary information to another computer system, such as a server computer system, which then automatically generates the viewable pages. These viewable pages are distributable over a network to other client computer systems. Thus, referring back to FIG. 2, this aspect of the present invention may allow a user on a client computer system 121 to create a media container which contains digital media and publish this media container with its digital media onto the Internet for other client computer systems to be able to view the media container with its digital media. This publication occurs through the use of one computer program on the client computer system which is designed to interact with another computer program on a server computer system, such as server computer system 111. The interaction between the software on the client computer system, such as system 121 and the server computer system, such as server 111, is designed such that the media container information and the digital media are supplied from the client computer system to the server computer system which then automatically generates the viewable pages, such as viewable HTML pages. These pages are then made available to a web server 109 which allows other client computer systems, such as client computer system 125 to view the HTML pages which have been published by the client computer system 121.

The ease of use of this aspect of the present invention is such that with only a few selections on a graphical user interface presented by the picture management software on the client computer system, the user of the client computer system can cause a media container with its associated digital media to be published to the Internet for others to view with conventional web browsers, such as Netscape's Navigator or Microsoft's Internet Explorer. It may only require the user of the client system to make a few selections by pointing and clicking at various radio buttons or icons on the computer screen of the client computer system to cause this publication to occur. For example, this publication may occur by making only one or two selections. It should also be noted that with the present invention any unrestricted member of the public has the capability to publish such media containers with the associated digital media. It will also be appreciated that while the interaction described herein between the client computer system, such as system 121 and the server system 111 is through the web server 109, it will be appreciated that the client system, such as system 121 may communicate directly with the server system 111 in an alternative embodiment or may communicate with only the web server 109 (where this server also provides the functions of server 111 and is also coupled to a media database, such as database 110).

Figure 5:
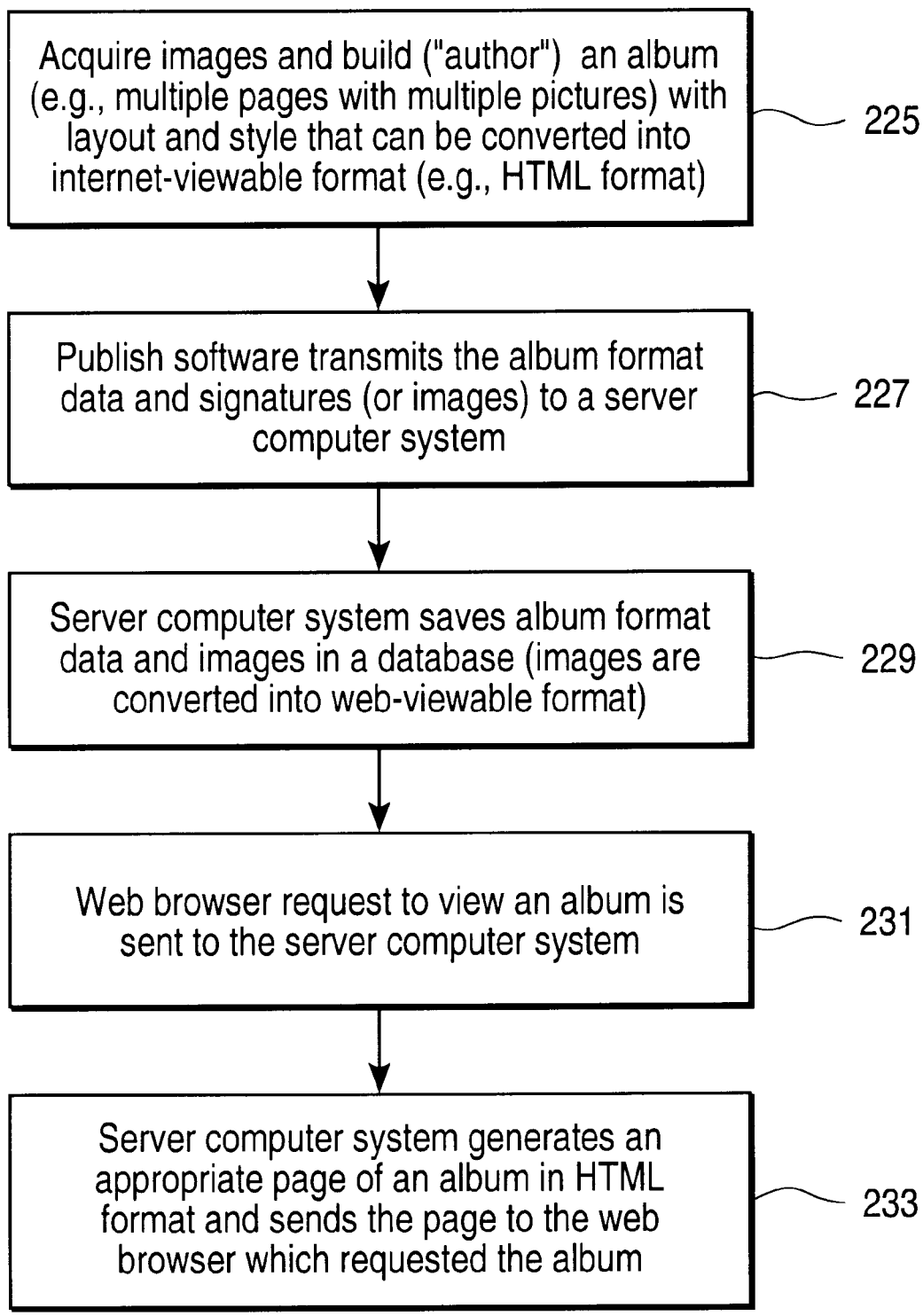
FIG. 5 shows an overall method for automatically generating viewable images over a network according to one aspect of the present invention.

FIG. 5 shows an overview of a process according to the present invention for publishing a collection of digital media, typically in a media container, onto a network, such as a network operating according to the HTTP protocol. The method of FIG. 5 begins in step 225 in which images are acquired. These images may be acquired from a digital camera, or a scanner, or from a file storage device such as a CD ROM or a hard disk. Then an album or other media container is authored by selecting a layout and style. Typically in the case of a picture album it will have multiple pages with multiple pictures, and a layout and style will be selected such that the number of pictures per page and the positions of the pictures is determined by the layout and the style. The album is convertible into an Internet viewable format such as the HTML format. In step 227 the software according to the present invention transmits the album format data and signatures (or the actual images themselves in an alternative embodiment) to a server computer system. In a typical embodiment, the album format data specifies the layout and style and number of pictures in the album. The signatures represent the content of each of the images in the media container, in this case a picture album. Further information with respect to the signatures may be obtained from copending U.S. application entitled "Methods and Apparatuses for Transferring Data Between Data Processing Systems" which is filed on the same date herewith by inventors Chan Chiu, Steve Morris, and Wu Wang; this copending application is hereby incorporated herein by reference. The signatures require less time to transmit and allow the client and the server computer systems to avoid transmitting images which already exist at a recipient system. In step 229 of FIG. 5, the server computer system saves the album format data and images into a database which is described further below. The images are converted into a web-viewable format before any requests to view the images are made by other client computer systems. In this manner, the web-viewable format images are pre-generated prior to "publication" or distribution to other client computer systems. In step 231, a user on another client computer system uses a web browser to request a view of an album and this request is sent to the server computer system. In one embodiment, the web browser on another client computer system sends a request to the web server 109 which then forwards this request to the server 111 which then determines the requested album and provides this requested album back to the web server 109 in a form which is viewable to the web browser operating on another client computer system, such as client computer system 125. The server computer system in step 233 thus generates an appropriate page of an album in HTML format and sends the page to the web browser which requested a viewing of the album. The various steps of FIG. 5 will be described further be low in conjunction with FIGS. 6A, 7, 8, and 9.

Figure 6A:
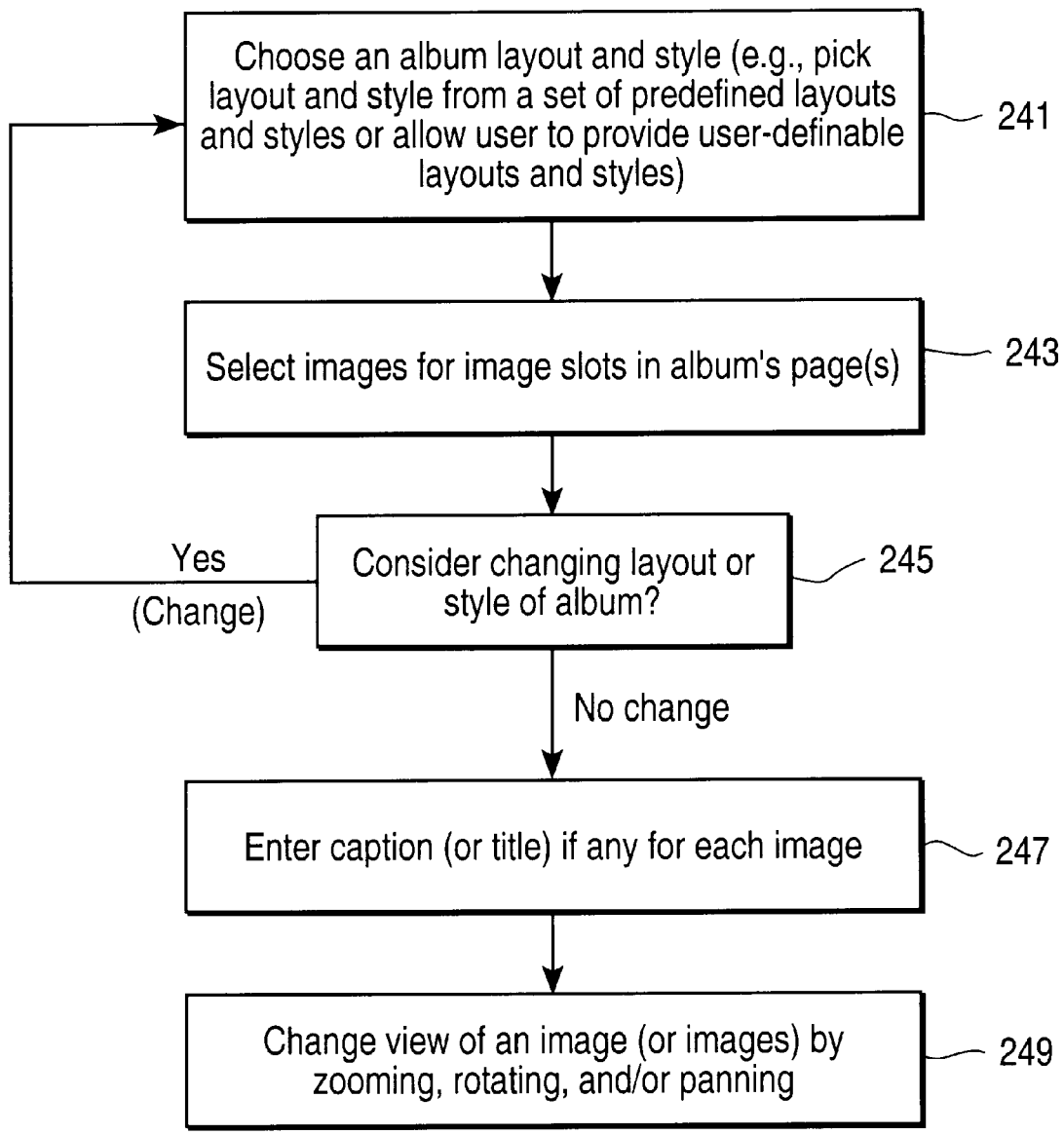
FIG. 6A is a flowchart illustrating one method for creating a picture album according to one aspect of the present invention; the method shown in FIG. 6A is in one embodiment a more detailed representation of the steps performed in step 225 of FIG. 5.
Figure 13:
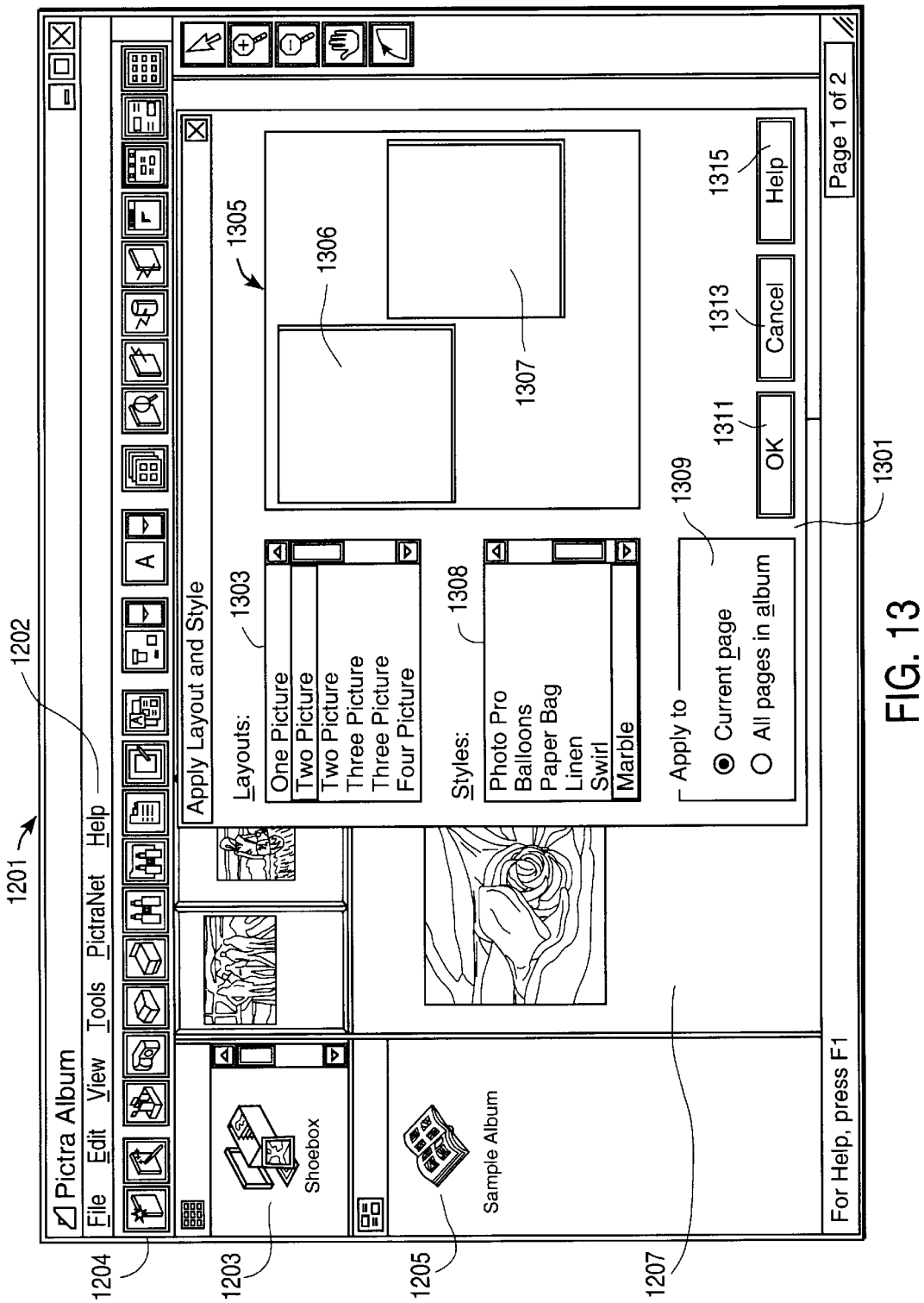
FIG. 13 shows a graphical user interface for allowing a user to select a layout and a style for a picture album according to one aspect of the present invention.

FIG. 6A shows one typical method of performing step 225 of FIG. 5. It will be appreciated that the sequence. of steps shown in FIG. 6A is arbitrary and that other sequences are possible depending on the way in which the user interacts with the picture management software on the client system which is publishing an album ("publishing client system"). In step 241, the user of the publishing client system chooses an album layout and style. This involves picking a particular layout and style from a set of predefined layouts and styles or in an alternative embodiment allowing a user to provide user-definable layouts and styles. Examples of these styles are shown in FIG. 13. In step 243, the user selects images for the various image slots on the album's pages. In step 245, the user considers whether or not to change the layout or style of the album. The user may at any time change the layout or style and the album will automatically and dynamically reformat itself. If the user decides to change the style or layout, processing returns to step 241. If no change is desired, then processing proceeds from step 245 to step 247. At this point, the user may enter a caption or title, if any, for each of the images. In step 249 the user may change the view of an image by zooming, rotating, and/or panning the image. As noted above, the user may perform these various steps in a different sequence. For example, the views of an image may be modified after an image has been selected for a particular slot in step 243. The captions may be entered after changing the view. It will be appreciated that other sequences for these steps may be performed.

Figure 6B:
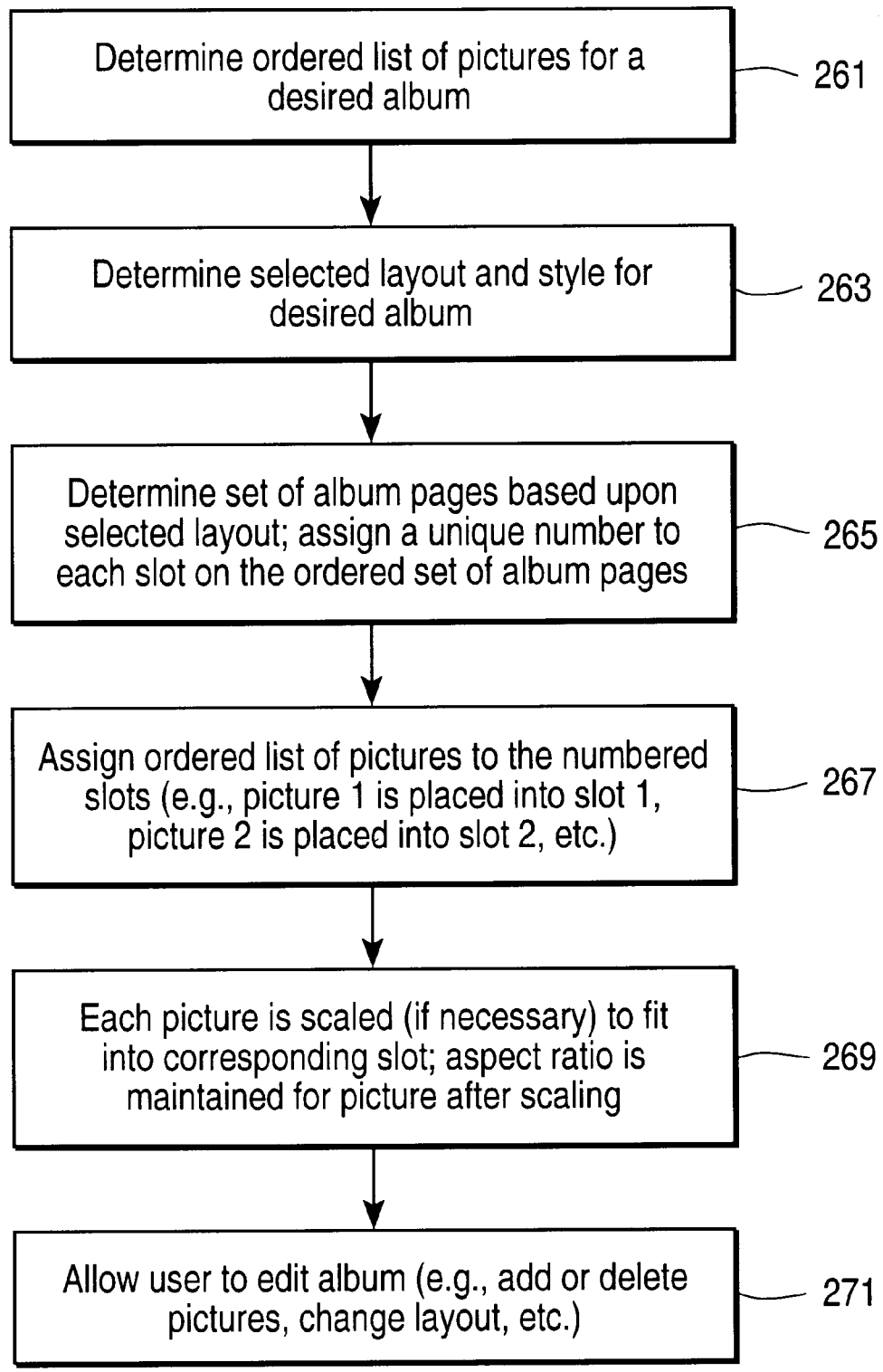
FIG. 6B is a flowchart illustrating one example of a method of creating a picture album according to one aspect of the present invention.

FIG. 6B illustrates a process for creating a media container, such as a picture album according to the present invention. In step 261, the picture management system, which may be considered a picture album authoring software, determines an ordered list of pictures for a desired album. Typically, the user will have selected certain pictures for a desired album and these pictures are put in an ordered list. The order of the pictures in the list may be changed by the user. In step 263 the album authoring software determines a selected layout and style for the desired album. This will typically be performed by receiving input from a user, such as input derived from a graphical user interface for the layout and styles such as that shown in FIG. 13. In step 265, the album authoring software determines the set of album pages based upon the selected layout. Further, the album authoring software assigns a unique number to each slot on the ordered set of album pages. Then in step 267, the album authoring software assigns the ordered list of pictures to the numbered slots on the album pages. For example, picture 1 in the ordered list of pictures is placed into slot 1 which would typically be on page 1 of the album. Picture 2 in the ordered list of pictures is placed into slot 2 which may be on page 1 of the album or on page 2 of the album. This assignment is performed for all of the pictures in the ordered list of pictures currently selected by the user. In step 269, the album authoring software scales each picture if necessary to cause it to fit into the corresponding slot on the album page. The aspect ratio of the picture is maintained after the scaling operation. The scaling operation is performed using conventional scaling techniques which achieve the same aspect ratio after the scaling operation. That is, the aspect ratio (height and width) of the original picture is the same as the aspect ratio of the picture as scaled to fit into the assigned slot on the album page. In step 271, the album authoring software allows the user to edit the the album. These editing options include adding or deleting pictures, changing the layout, editing each picture (e.g. panning, zooming, and rotating), etc. It will be appreciated that editing of the album may invoke the process of FIG. 6B to be repeated beginning with step 261 in which the album authoring software determines the ordered list of pictures. For example, if an additional picture is added, the list is changed and an additional album page may be added if an available slot on a page does not exist.

Figure 7:
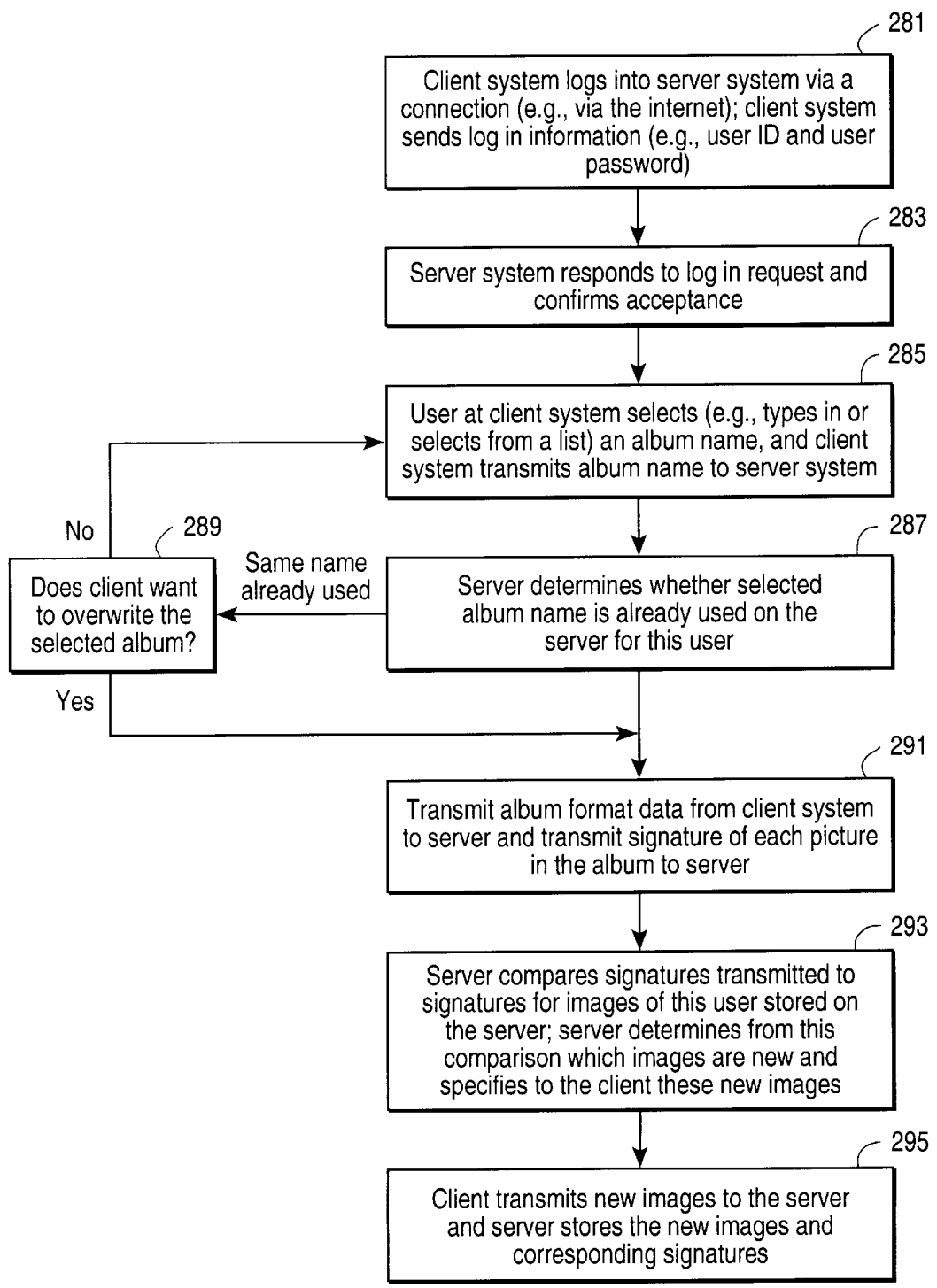
FIG. 7 shows a flowchart which illustrates various steps which may be performed as part of the step 227 shown in FIG. 5.

After the user has created a picture album with associated pictures, the user may then decide to publish or otherwise distribute the picture album by making it available for viewing to web browsers over the Internet. The beginning of this process is shown in FIG. 7, which shows a sequence of steps represented by one step, step 227 of FIG. 5. In step 281 of FIG. 7, the client system from which the album will be published logs into a server system via a connection. Typically this connection is via the Internet and thus Internet protocols are used between the client system and the server system. In one embodiment, a client system, such as system 121 communicates to the server computer system 111 through the web server 109 shown in FIG. 2. The client system from which publication is to occur sends the log-in message, such as user ID and user password to the server system. In step 283, the server system responds to a log-in request and confirms acceptance. Then in step 285, the user at the client system selects an album name. This selection may occur by typing in a name or by selecting a name from a list. The client system then transmits the album name to the server system. In step 287, the server determines whether the selected album name is already used on the server for this user. In one embodiment, referring back to FIG. 2, the server computer system may be the server system 111 which maintains a picture database for the particular user; this picture database is contained within database 110 and is typically for many users, including the user who logged in in step 281. If, in step 287, the server determines that the same album name is already used by this user, then the server sends a message to the client system to ask the client system, in step 289, whether the client system wants to overwrite the selected album. If the client responds with a no then the client is again requested in step 285 to select a name for an album. If the client system responds to the question from step 289 by indicating yes then processing proceeds from step 289 to step 291. If the server in step 287 determines that the selected album name is not already used on the server for this user, then processing proceeds directly from step 287 to step 291. In step 291, the client system which is publishing the album transmits the album format data to the server and also transmits a signature of each picture in the picture album to the server. The server has its own database of signatures for images of this user and compares the signatures received in step 291 to the signatures stored in a picture database for this user. This comparison allows the server to determine which images are new (e.g. they are not stored on the server for this user). Thus the server determines from this comparison which images are new and provides a list of such images to the client. In step 295, the client transmits these new images to the server and the server stores the new images and corresponding signatures. The signatures are typically stored in a picture database maintained on the server system as described below.

Figure 8:
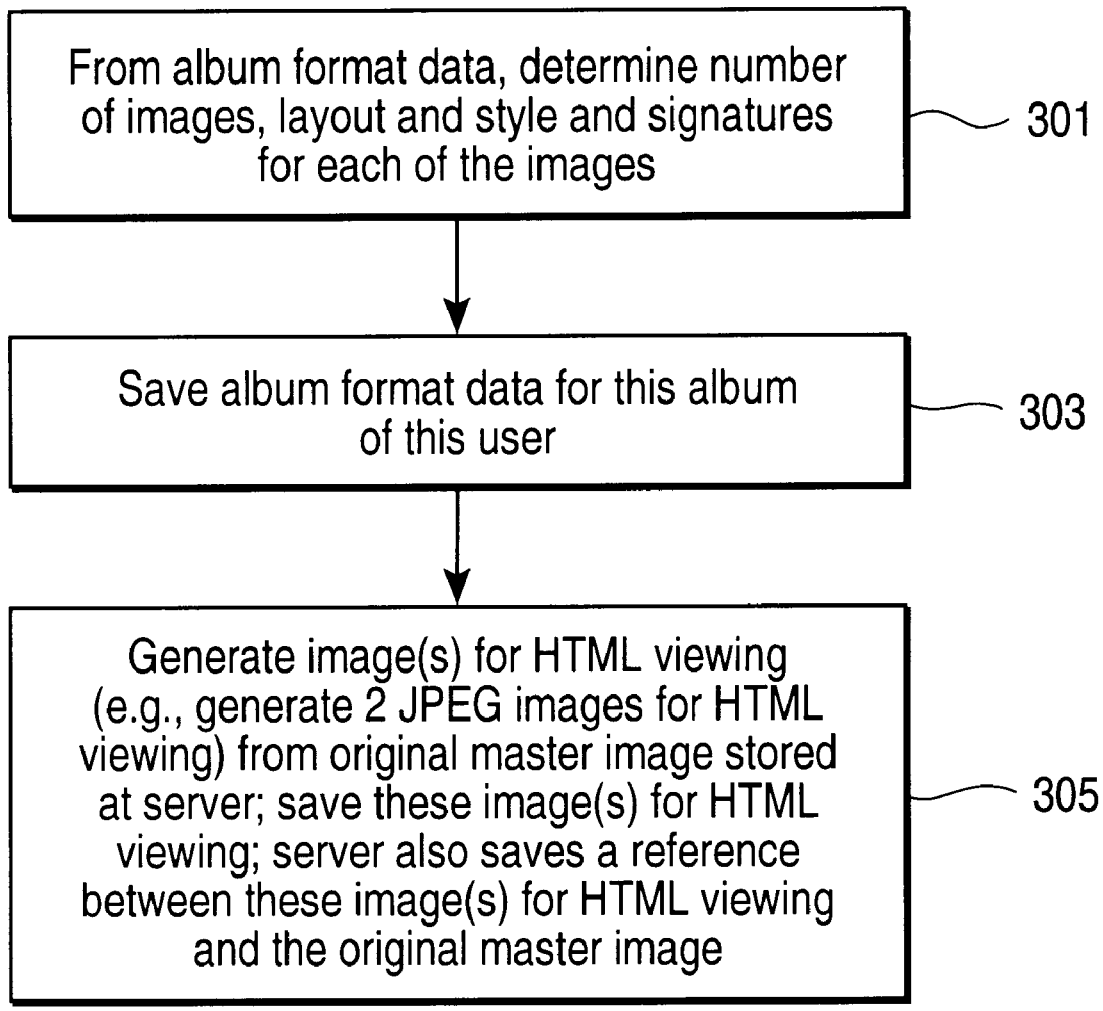
FIG. 8 shows a flowchart which illustrates several steps in one embodiment which may be performed as part of the step 229 of FIG. 5.

FIG. 8 shows further processing steps which are performed by the server system after receiving the album format data and the images from the client system. The steps of FIG. 8 correspond to step 229 of FIG. 5. The server in step 301 determines the number of images, the layout and style, and signatures for each of the images from the album format data. In step 303, the album format data is saved for this album of this user. Typically, the album format data will be saved in the picture database maintained by the server computer system. In step 305, the server computer system, such as server system 111 generates images for HTML viewing. In one embodiment, two different JPEG images of different resolutions are generated for HTML viewing. These JPEG images are generated from the original master image which is stored at the server and which was received from the client in step 295 of FIG. 7. Typically, these two JPEG images will be saved for later HTML viewing. These images are usually pre-generated prior to any HTML viewing or any distribution or publication over the Internet. The server also saves a reference between these images and the original master image in order to allow downloading of the original master image upon a selection of one of the HTML viewing images.

Figure 9:
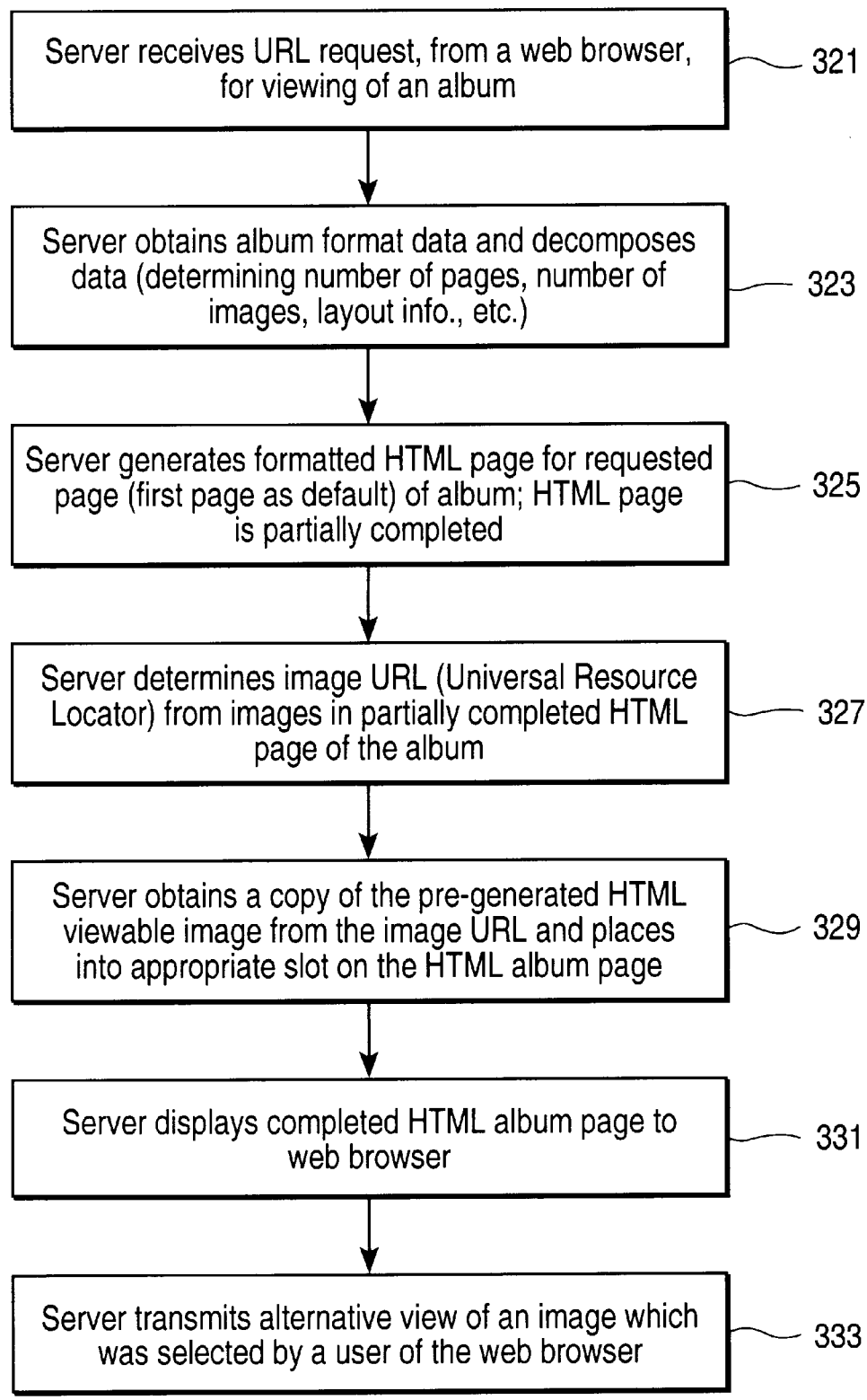
FIG. 9 shows one method according to the present invention for performing the steps of step 233 shown in FIG. 5.

In one embodiment of the present invention, the picture album is now ready to be viewed and thus be distributed or published over the Internet. A web browser request from another client system, such as client system 125, is received at the web server 109, and the web server 109 forwards this request to the server 111. FIG. 9 illustrates in one example a method for returning the HTML page requested by the other client computer system. The steps shown in FIG. 9 are shown as one step 233 in FIG. 5. Referring back to FIG. 9, step 321 involves the server, such as server 111 receiving a URL (universal resource locator) request, from a web browser operating on another client computer system. This request is for viewing of an album. It will be appreciated that the server may receive this request from the client system which published the album. In step 323, the server obtains the album format data from its database and decomposes this data in order to determine the number of pages, the number of images, the layout information, and other information necessary to generate the album page. The server in step 325 then dynamically generates a formatted HTML page for the requested page (where the first page of the album is the default page) of the album. At this point the HTML page is partially completed (with image URLs specifying pictures in the album pages). In step 327 the server determines the image URL from the images in the partially completed page of the album. The server then obtains a copy of the pre-generated HTML viewable image from storage (e.g. from the server's database). This stored pre-generated HTML viewable image was created in one embodiment in step 305 of FIG. 8. The HTML viewable images are then placed into their appropriate slots on the HTML album page. Then in step 331, the server causes the web browser which sent the request in step 321 to display the completed HTML album page to the user of the client system which is operating the web browser. The server then in step 333 transmits an alternative view of an image which was selected by a user of the web browser. For example, the user may select a particular picture by pointing a cursor on the display at the image and by selecting the image by pressing a button, such as a mouse button, while the cursor is positioned over the image; this selection signals to the server to transmit an alternative view which may be a higher resolution image, such as the second JPEG image created in step 305.

Figure 10:
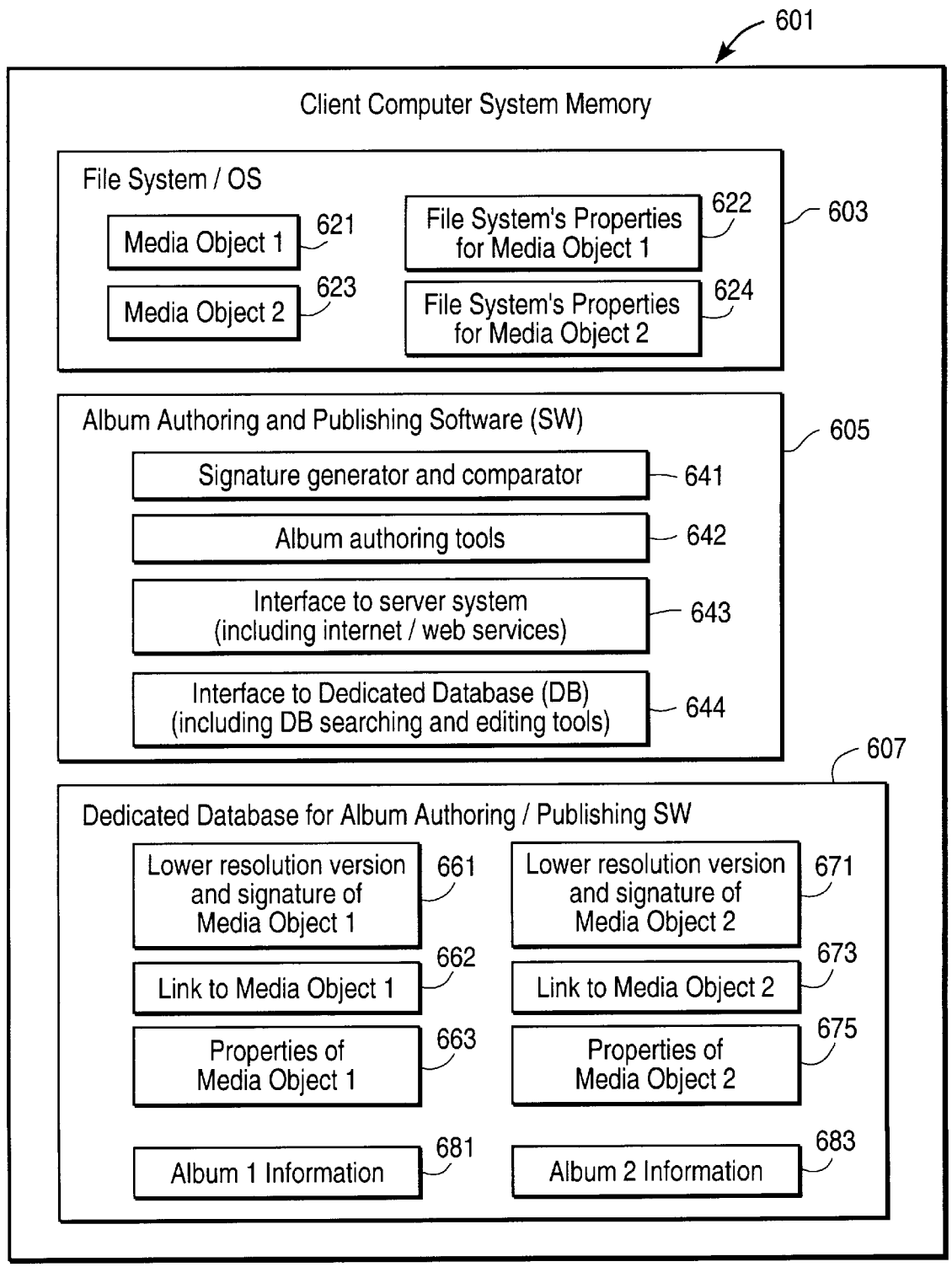
FIG. 10 shows an example of a computer readable storage medium for a client computer system which may be used with one aspect of the present invention.
Figure 11:
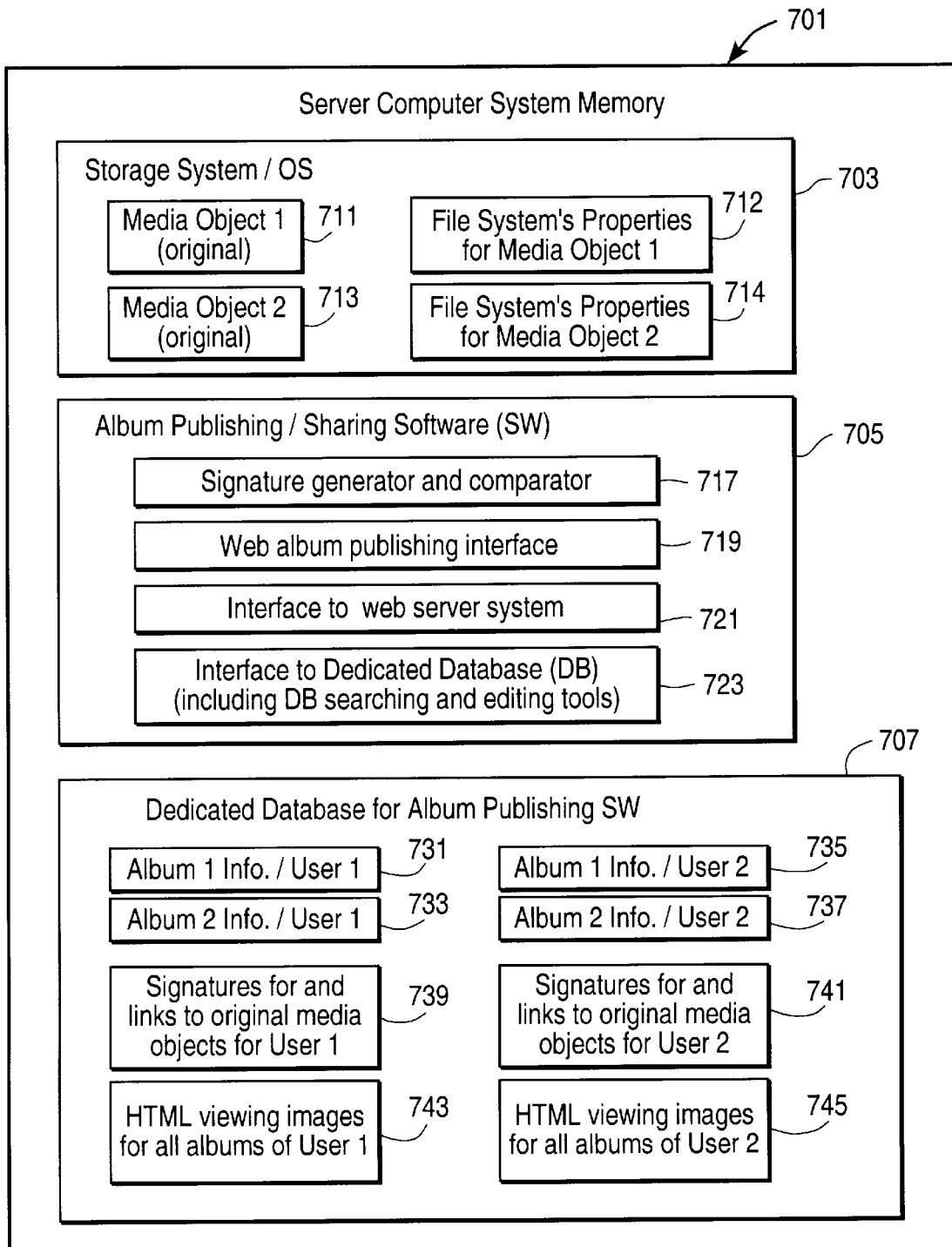
FIG. 11 illustrates a computer readable storage medium for a server computer system which may be used with one aspect of the present invention.

FIGS. 10 and 11 illustrate examples according to one embodiment of the present invention for two different computer readable storage media. It will be appreciated that the actual memory which stores this information may be different elements, such as the memory 509 and the mass memory 515 or they may be the same element, such as the mass memory 515. In one example of a network computer where there is no non-volatile mass memory, the necessary software files and data files may be downloaded to the memory 509 for execution in a processor in a network computer. In this case, the memory 509 provides the computer readable storage medium.

FIG. 10 illustrates an example of a computer readable storage medium containing various elements which are used with one embodiment of the present invention. The medium 601 includes a file system and an operating system (OS) element or module 603 which is used to control the file system for the client computer system as well as providing the operating system support such as the disk operating system and other aspects of the operating system. Another element is the album authoring and publishing software 605 which is used to create and modify albums and to interface with the server system in order to publish and/or share those albums. Another element is a dedicated database which is dedicated to the album authoring/publishing software. This database element 607 includes information for the various pictures in the various albums a user may create. While digital pictures represent one embodiment of the present invention, it will be appreciated that digital media or media objects refers generally to audio digital media, video digital media and software files, such as a word processing file created by a word processing computer program. However, the preferred embodiment is one in which the digital media or digital pictures are assembled into a picture album, where the album has multiple pages and where at least some of the pages include multiple pictures.

As shown in FIG. 10, the file system/OS element 603 includes media objects 621 and 623 which are the actual binary data of two different media objects, media object 1 and media object 2, stored on a hard disk or other media under control of the disk operating system. The disk operating system creates file system properties, such as properties 622 and 624 which specify various file system related properties for the two media objects. These include file size, date of creation, and document type (e.g. JPEG, BMP, etc.). The album authoring and publishing software element 605 includes four modules 641, 642, 643, and 644. The signature generator and comparator 641 is the executable computer program for generating and comparing the signatures or representations according to the present invention. The album authoring tools 641 allows a user to create a picture album by selecting layout information which specifies the number and location of pictures on a page throughout multiple pages of a picture album. The interface to server system module 643 includes Internet and web services allowing the client computer system which includes the computer readable memory 601 to interface with a server system, such as the server computer 111 of FIG. 2. The interface to dedicated database module 644 includes database searching and editing tools allowing the album authoring and publishing software to search and edit the dedicated database 607.

FIG. 10 shows an example of the dedicated database 607. It will be appreciated that data may be stored in other formats and ways in this database. As shown in FIG. 10, for each media object, there is stored in the database a lower resolution version of the digital picture as well as the signature of the media object and a link to the original (higher resolution) media object as well as information indicating the properties of the media object. Thus, the lower resolution and signature of media object 1 is stored with a link to the original media object 621 stored in the file system as well as the properties of the media object 1, which properties are typically in addition to the file system's properties 622. Similarly, for media object 2, there is stored a lower resolution version, such as a thumbnail image, of the media object 2 and the signature or representation of the media object 2. There is also a link or pointer to the original media object 2 which is the media object 623 maintained by the file system. Further, there are properties for the media object 2 which are in addition to the properties 624. The database 607 further includes information specifying layout and other information for album 1, labeled as information 681, and information 683 specifies information for a second album which may include different pictures than album 1 or may include some of the same pictures as album 1.

In one embodiment, the client computer system's computer readable media 601 may at some time be entirely stored in non-volatile mass memory, such as a hard disk. At other times, the various elements shown in FIG. 10 may be dispersed between dynamic memory, such as memory 509, and a mass memory, such as mass memory 515.

FIG. 11 shows an example of the computer readable storage medium 701 which may be used with a server computer system of the present invention. This memory, which again may be dispersed among memory elements or may be stored entirely on a hard disk or other non-volatile storage media, includes three elements which are the file system/operating system element 703, the album publishing/sharing software 705, and the dedicated database for the album publishing software 707.

The file system and operating system element 703 includes the original, higher resolution media objects 1 and 2 shown as elements 711 and 713. These elements are the actual digital (or other) data of the media object stored on the computer readable medium under control of the file or storage system such as a disk operating system. The file or storage system also stores properties which are the file system's properties for the media object, such as properties 712 and 714. These properties typically include the file's size for each media object as well as the date of creation, the date of last modification and the type of document. The album publishing/sharing software 705 includes a signature generator and comparator module which is responsible for generating representations or signatures of the media objects and to compare signatures or representations in accordance with the present invention. The web album publishing interface 719 performs functions relating to decoding information with respect to the albums and generating albums as a result of decoding the information specifying album format. The interface to web server system 721 is an optional software module which is used to allow the server computer system 111 to interface with the web server 109. Typically, some services are required in order to interface between the album publishing and sharing software and the software required for providing web server functionality. The interface to the dedicated database element 723 provides for database searching and editing of the dedicated database 707.

The dedicated database 707 includes information 731 for a first album of user 1 and information 733 for a second album of user 1. It also includes information 735 for a first album of a second user and information 737 for a second album of the second user. There is also stored in the database 707 the signatures for and the links to the original media object for the first user. This information may be stored in separate tables or together in one table. The links point back to an original media object, typically by picture name and full path name to the original media object, such as media object 711 as stored in the file or storage system of the server system. The signatures are used when comparing signatures received from the client system when connected with user 1 in the case of the signatures stored with element 739. Also for user 1, the database either stores or refers to a separate storage for the HTML viewing images for all albums of user 1. This element 743 is generated from the media object, such as the original media object 1 stored as element 711 in the file system. Typically, the HTML viewing images are a lower resolution version of the original media object and will be displayed to users when browsing the web server 109. The database 707 contains similar information, such as the elements 741 and 745 for the second user.

Figure 12A:
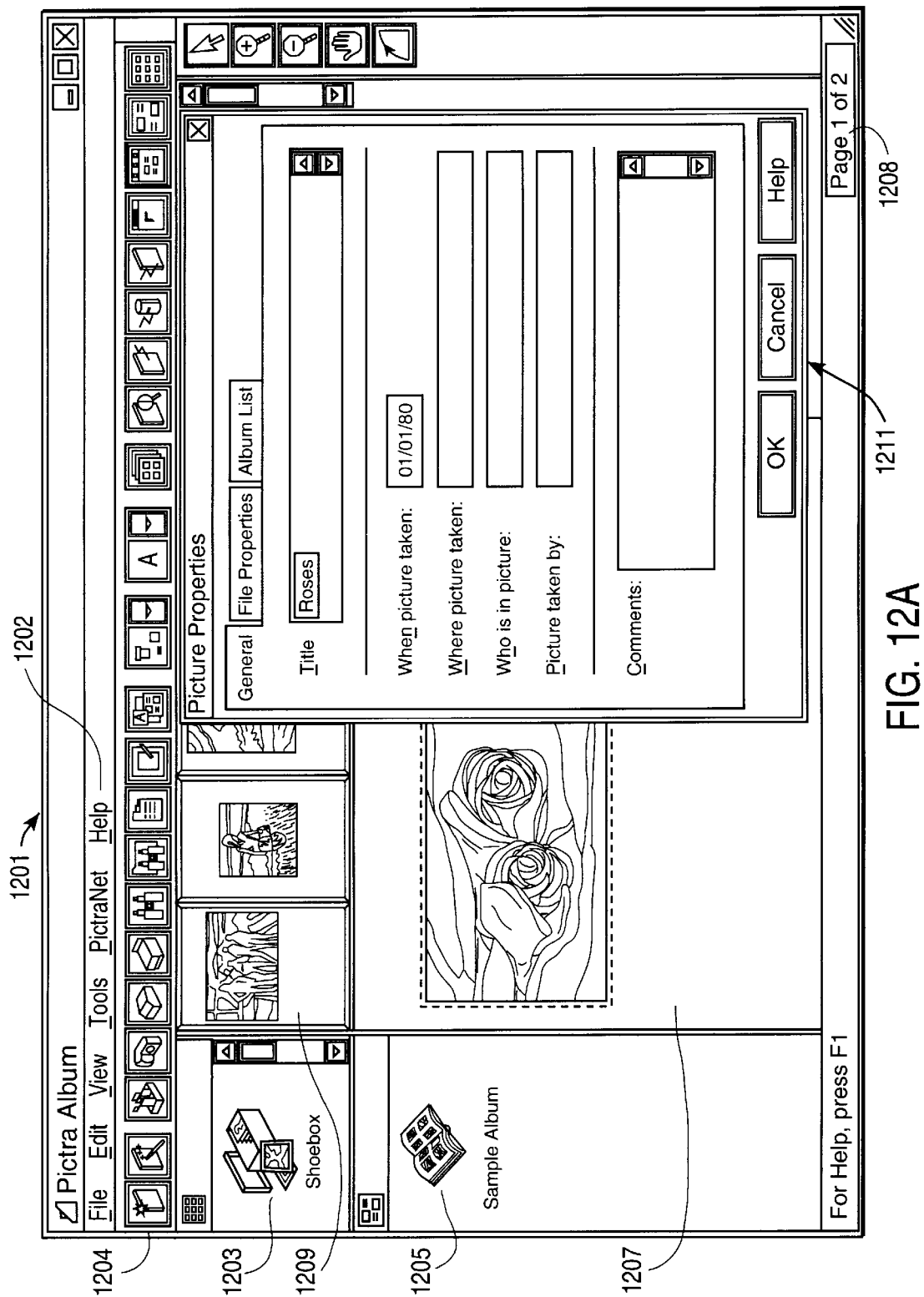
FIG. 12A, illustrate a particular graphical user interface which depicts an example of the various information which may be maintained in a picture database according to one aspect of the present invention.
Figure 12B:
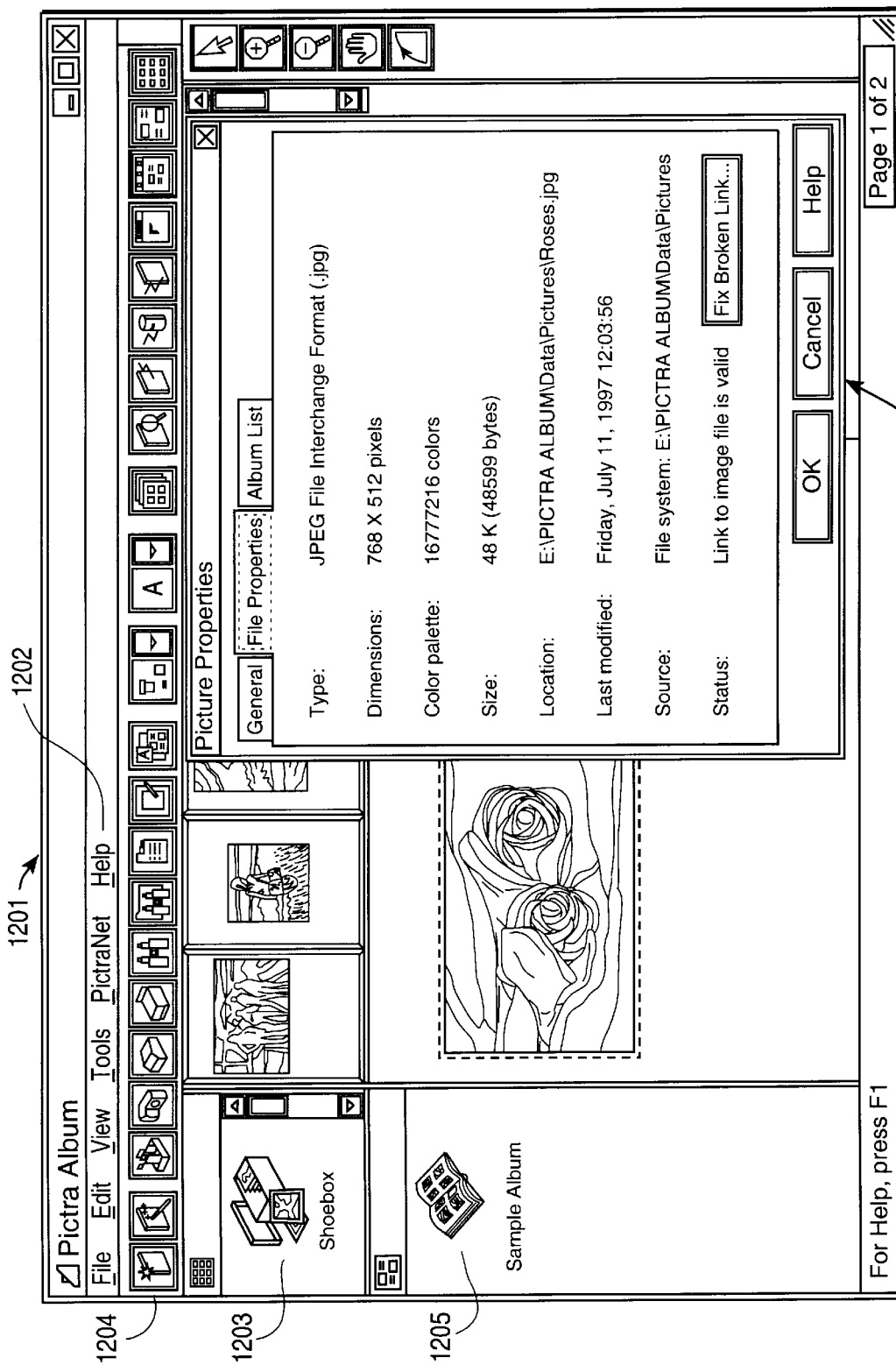
FIG. 12B illustrates a particular graphical user interface which depicts an example of the various information which may be maintained in a picture database according to one aspect of the present invention.
Figure 12C:
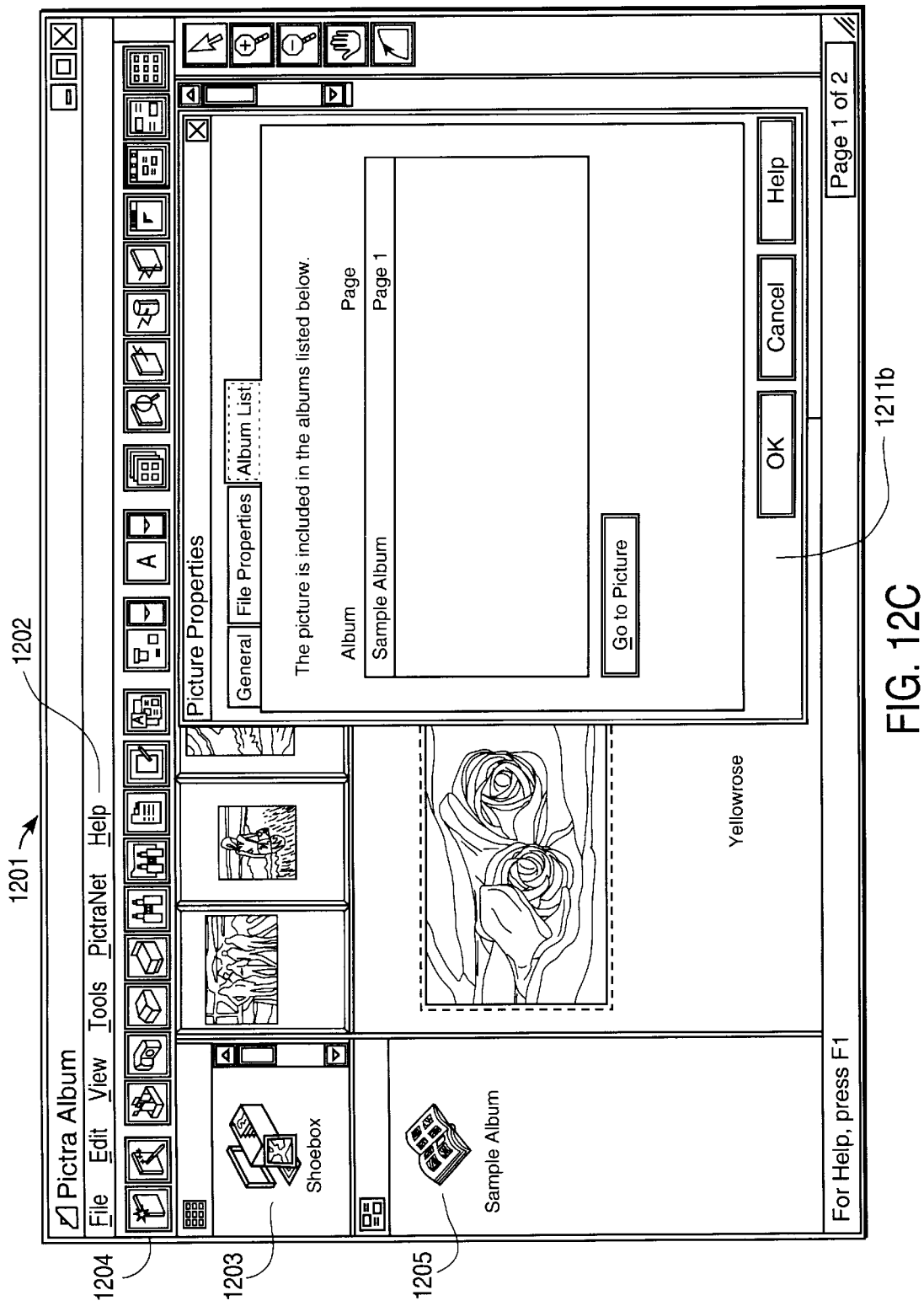
FIG. 12C illustrates a particular graphical user interface which depicts an example of the various information which may be maintained in a picture database according to one aspect of the present invention.

FIGS. 12A, 12B and 12C illustrate three views of a graphical user interface according to an album authoring and publishing software according to the present invention which may be considered a picture management system. These three figures show a window 1201 having a menu bar 1202 which provides pull-down menus for various commands in the picture management software of one aspect of the present invention. Below the menu bar 1202 is a bar 1204 with icons which represent various commands for the software. Immediately below this bar 1204 is a shoebox window showing a shoebox icon 1203 which is shown as being opened. To the right of this shoebox icon 1203 is a row of thumbnail images 1209. In one embodiment, these thumbnail images may be created using conventional software, such as that provided by LeadTools which is used to create a bitmap for the thumbnail version of the original image. Below the row of thumbnails 1209 is an album page 1207 in the opened sample album 1205. A properties window is shown open in all three images (FIGS. 12A, 12B, and 12C). These picture properties windows 1211, 1211a, and 1211b show the various properties or attributes saved for a particular picture in a picture database maintained by and for the authoring/publishing software of the present invention. As can be seen from FIGS. 12A, 12B, and 12C, the attributes or properties for each image may include the title of the image, when the picture was taken, where the picture was taken, who was in the picture, the photographer of the picture, text comments, as well as file properties (e.g. file type, number of pixels, file size, path name, date the file was last modified) etc. The picture properties may include, as shown in window 1211b, a list of all the albums in which this picture is included. It will be appreciated that the text shown in window 1211 is typically entered by a user; this text may be useful later when searching for a particular picture (e.g. such as searching for all pictures which have Jennifer and Lindsey in the picture).

It will be appreciated that a picture database maintained at a client system may include additional information not required to be maintained in a database for the same picture at a server computer system.

FIG. 13 shows a graphical user interface provided by the album authoring/publishing software of the present invention. Window 1201 is partially covered by the layout and style window 1301. The layout and style window 1301 allows a user to select various layouts 1303 and various styles 1308. The preview window 1305 shows the currently selected layout. Thus as shown in FIG. 13, the preview window 1305 shows a two-picture layout with the picture slots 1306 and 1307 staggered on the album page shown in the preview window 1305. The user may then select the particular layout by clicking the OK button 1311 or may cancel the selection by clicking the cancel button 1313. Help may be provided by clicking the help button 1315. It will be appreciated that the term "click" refers to a well known graphical user interface technique whereby a user positions a cursor, typically with a mouse, over a particular screen object and then depresses a mouse button or some other button on the computer system to select the displayed screen object.

FIGS. 14A–14E also show various graphical user interfaces for an album authoring and publishing software according to the present invention. Window 1401 includes the menu bar 1202 and the bar of icons 1204. In addition, the shoebox icon 1203 is shown as open which reveals the thumbnails 1209 along a row. As can be seen from FIG. 14A, not all thumbnails are shown along the row and thus there is a scroll bar along the side to allow the user to display the rest of the thumbnails. The shoebox icon 1203 represents all the pictures in the picture database maintained by the authoring/ publishing software of the present invention. That is, the shoebox represents the picture database at a client system, such as the picture database 607 of FIG. 10. Below the shoebox icon 1203 is a sample album icon 1205 which is shown as being open. This sample album icon is shown as open because a particular page from this sample album is displayed. In particular, page 1207 from the sample album represented by icon 1205 is shown below the row of thumbnails 1209. The page 1207 includes two digital pictures 1415 and 1417 displayed in a two-picture layout. Page 1 is indicated by page indicator 1208 as shown. Page 2 may be selected by clicking on the tab 1407 or by clicking on either arrow 1409 or 1411. The user may toggle between these two pages by alternatively clicking on tabs 1405 and 1407.

Figure 14A:
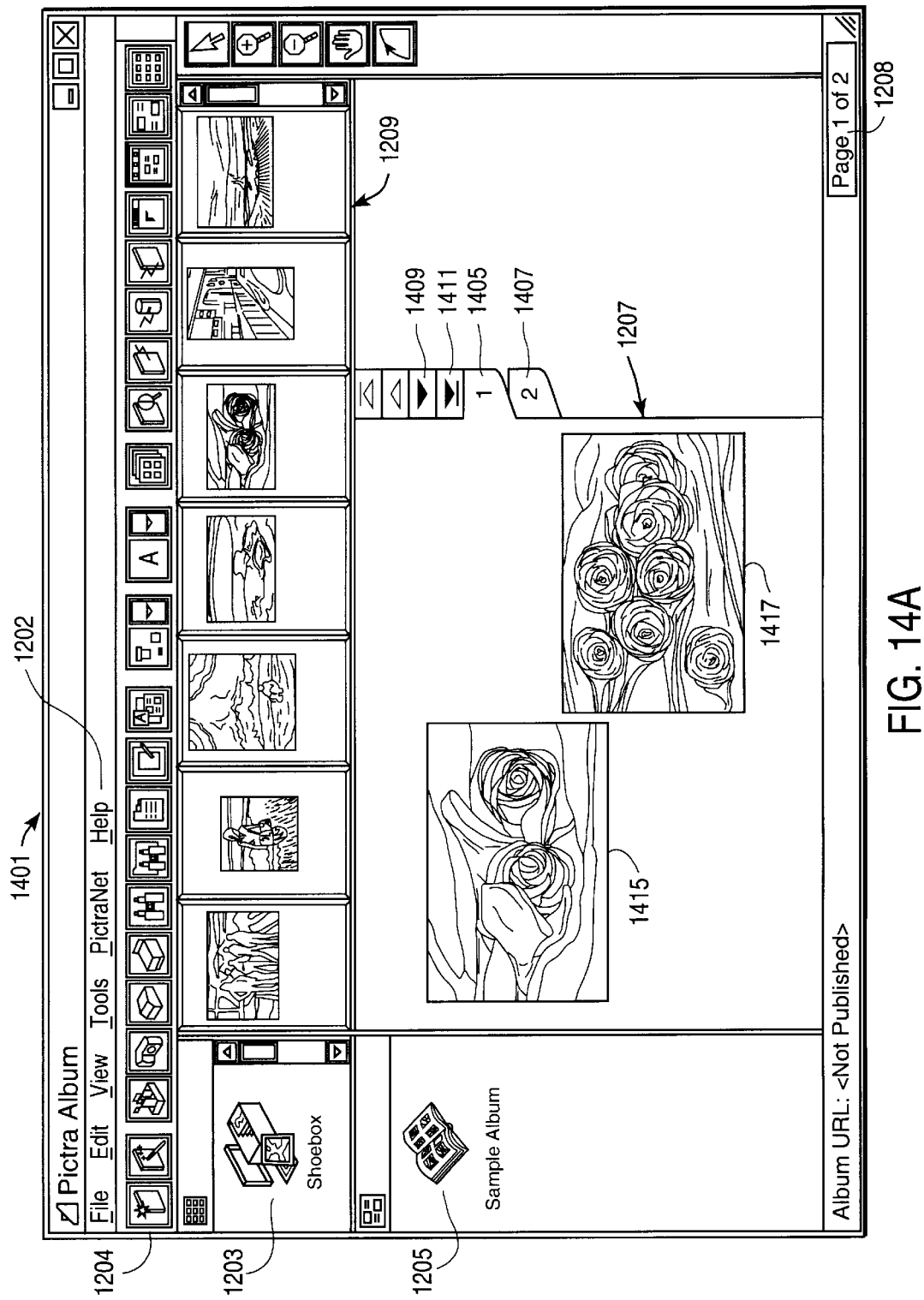
FIG. 14A illustrates one example of a graphical user interface of the present invention which allows the user to view and control various aspects of one or more albums and the pictures in the albums.
Figure 14B:
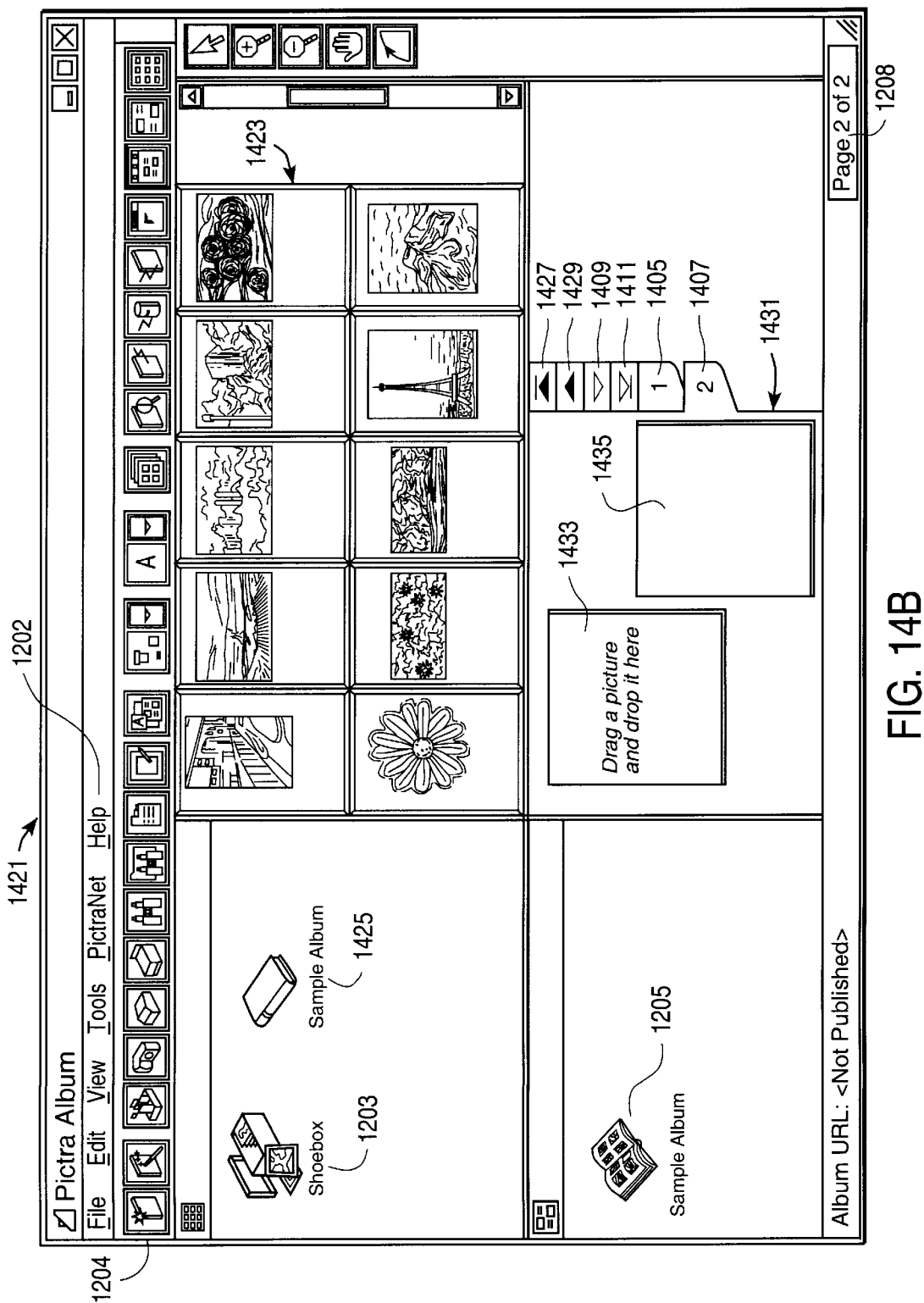
FIG. 14B illustrates one example of a graphical user interface of the present invention which allows the user to view and control various aspects of one or more albums and the pictures in the albums.

FIG. 14B shows an alternative view of a graphical user interface for an album authoring/publishing software according to one aspect of the present invention. The window 1421 includes an alternative view of the thumbnails 1423 which is to the right of the shoebox icon 1203 and the sample album icon 1425. The shoebox icon is shown as being open, thus revealing all the thumbnails in the picture database. The sample album icon 1425 is shown as closed; if it were open, as will be clear from the discussion below, only the thumbnail s from this album would be presented in the thumbnail region to the right of the sample album icon 1425. An album page from the sample album is shown in the lower half of the window 1421. The sample album icon 1205 is shown as open and a second page of this album is shown to the right (in the album page region). The page indicator 1208 shows that the second page is being displayed for the sample album. Two picture slots 1433 and 1435 remain to be filled on the second page of this album. The user may return to the first page by either clicking on the tab 1405 or clicking on the arrows 1429 or 1427. It will be appreciated that arrow 1429 moves to the prior page, and arrow 1409 in FIG. 14A moves to the next page. Arrow 1427 moves to the first page of the album, and arrow 1411 moves to the last page of the album. In FIG. 14B, page 1431 is the last page of the album as shown by the indicator 1208.

Figure 14C:
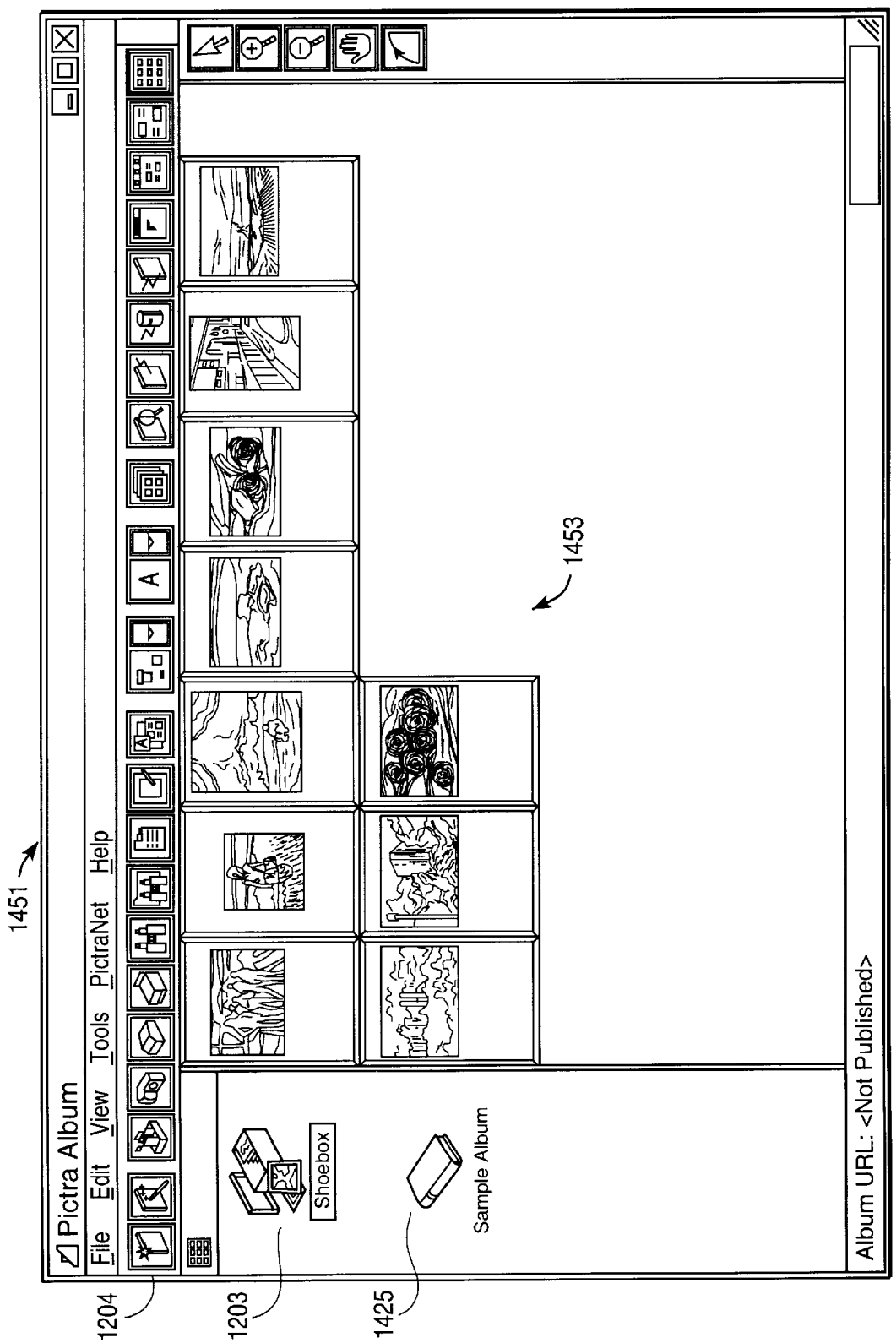
FIG. 14C illustrates one example of graphical user interface of the present invention which allows the user to view and control various aspects of one or more albums and the pictures in the albums.

FIG. 14C shows an alternative view of a graphical user interface for an album authoring/publishing software according to one aspect of the present invention. The view shown in window 1451 is of thumbnails only. In the particular view shown in FIG. 14C, all the thumbnails 1453 in the database represented by the shoebox icon 1203 are shown in the window 1451. The sample album icon 1425 is shown as closed because thumbnails for only that sample album are not being shown.

Figure 14D:
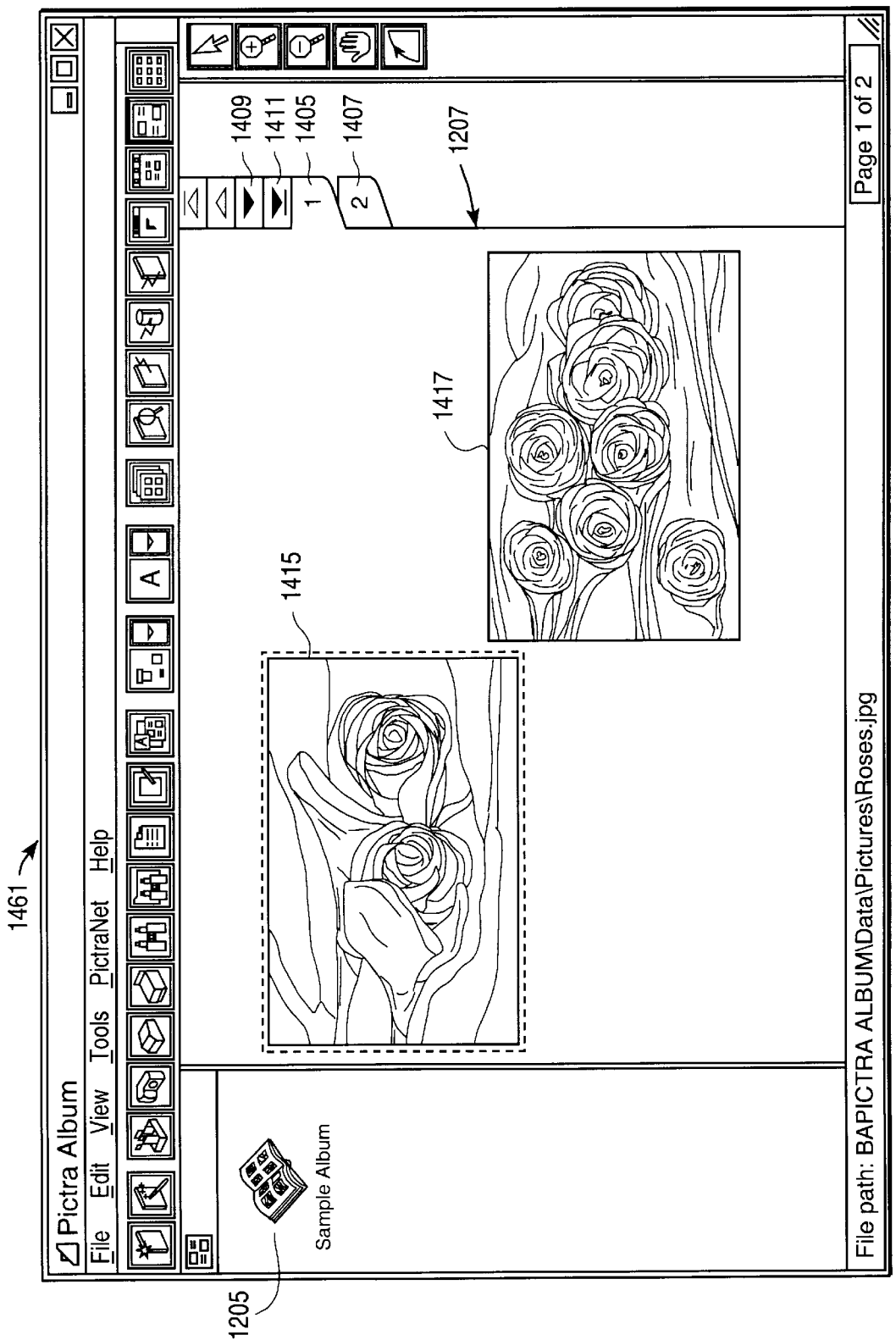
FIG. 14D illustrates one example of graphical user interface of the present invention which allows the user to view and control various aspects of one or more albums and the pictures in the albums.

FIG. 14D shows yet another graphical interface for an album authoring/publishing software according to one aspect of the present invention. In the window 1461, and album page only view is shown. That is, no thumbnails are shown in this view. Thus a page from the opened sample album represented by sample album icon 1205 is shown. This page 1207 includes two digital pictures 1415 and 1407 arranged in a two-picture layout.

Figure 14E:
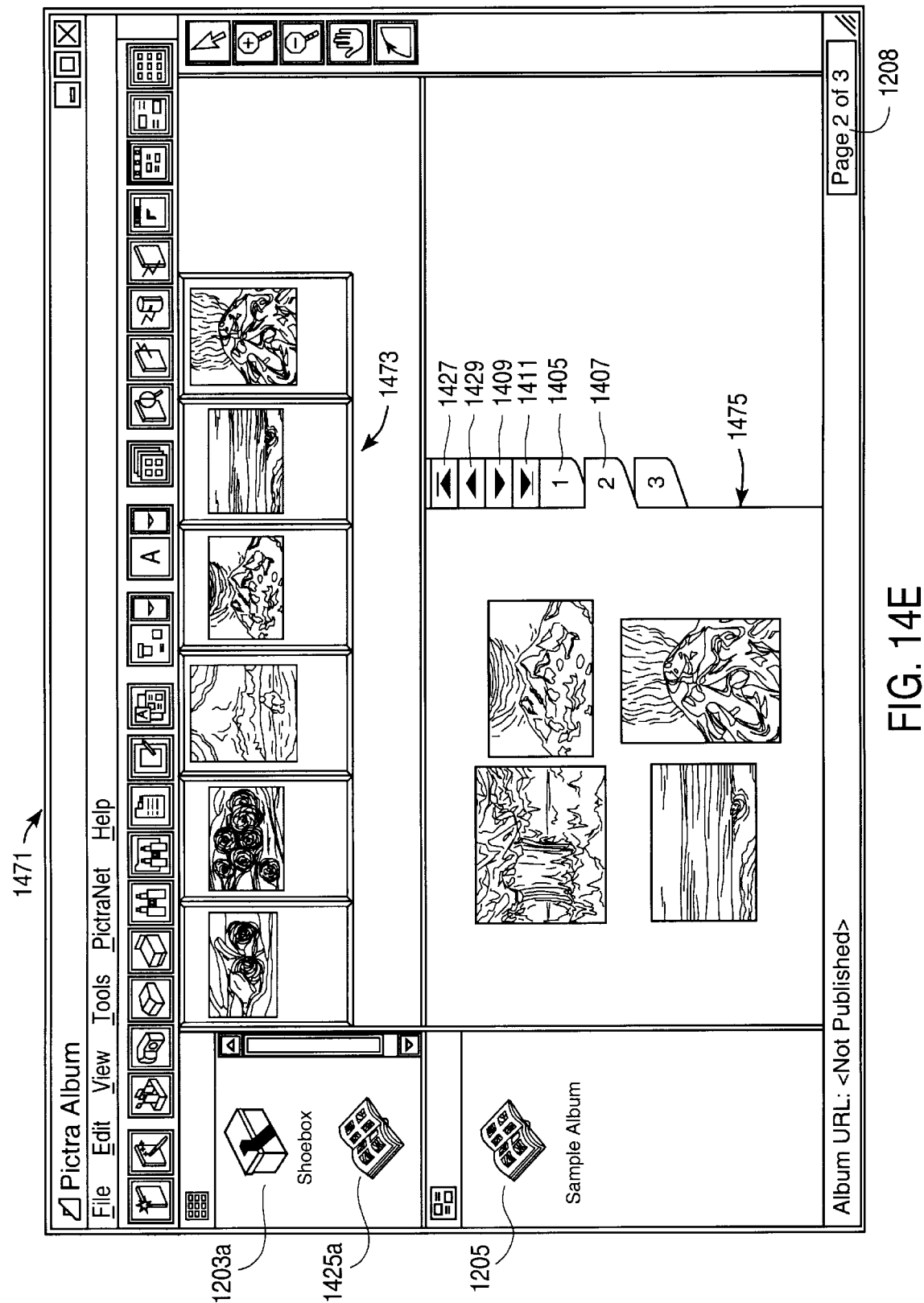
FIG. 14E illustrates one example of graphical user interface of the present invention which allows the user to view and control various aspects of one or more albums and the pictures in the albums.

FIG. 14E shows yet another graphical user interface for an album authoring/publishing software program according to one aspect of the present invention. The window 1471 shows the concurrent view of thumbnails and a page album. Thus thumbnails 1473 are shown in the upper portion of this window and an album page 1475 is shown in the lower portion of this window. The sample album icon 1205 is opened indicating that a sample page from this album is shown, in this case page 1475. This particular sample album has three pages as indicated by the indicator 1208 and by the tab labeled with a "3" as shown in FIG. 14E. The shoebox icon 1203a is shown as closed and the sample album icon 1425a is shown as open. This indicates that the thumbnails 1473 are only from the sample album selected by selecting the icon 1425a. In this manner, the thumbnails displayed on the upper portion of window 1471 (the thumbnail display region) may be from an album which is different than the album shown in the lower portion of the window 1471. In this manner, a user may copy an image from one album into another album.

The foregoing description has provided numerous examples of the present invention. It will be appreciated that various modifications and changes may be made thereto without departing from the broader spirit and scope of the invention as set forth in the appended claims. One modification involves a client software program which can automatically generate publishable web pages (HTTP format) without any server software (at the server) which is designed to work specifically with the client software. This client software would allow a client user to turn virtually any ISP's web server into a web publishing server without any specialized server software at the server. This modification is similar to the distributed client and server software described above except that the client software automatically generates the HTML pages and links to the images and then performs an intelligent FTP file transfer to the ISP's web server. The intelligent FTP file transfer places the transferred files into the proper directories at the ISP's web server. Typically, this may require the assistance or permission of the ISP. Further details concerning particular embodiments of the present invention may also be found in the following copending patent applications which were filed on the same date as this application and which are hereby incorporated herein by reference; these copending applications are as follows: "Methods and Apparatuses for Transferring Data Between Data Processing Systems" by inventors Chan Chiu, Steve Morris, and Wu Wang; and "Methods and Apparatuses for Acquiring a Digital Image for Use in a Digital Processing System" by inventors James Lei and Wu Wang.

What is claimed is:

1. A method for publishing on a network operating according to an HTTP protocol a collection of digital media, said method comprising:

generating a collection of digital media at a client digital processing system;

transmitting collection information, which describes said collection of digital media, from said client digital processing system to a server digital processing system;

pregenerating automatically from said collection information a plurality of presentable media each of which is capable of being presented to other client digital processing systems which are coupled to said network which is operating according to said HTTP (hypertext transfer protocol) protocol.

2. A method as in claim 1 wherein said digital media comprises digital images and wherein said presentable media comprises viewable images and wherein said client digital processing system and said server digital processing system are each programmed to interact together such that said server digital processing system generates automatically, from said collection information, said plurality of viewable images.

3. A method as in claim 2 further comprising:

transmitting, from said server digital processing system, said plurality of viewable images to a World Wide Web (WWW) server digital processing system;

transmitting said plurality of viewable images from said WWW server digital processing system to at least one of said other client digital processing systems, wherein said WWW server digital processing system is coupled to said network and wherein said client digital processing system is coupled to said network and transmits said collection information to said server digital processing system using said HTTP protocol.

4. A method as in claim 2 wherein each of said plurality of viewable images is in an HTML (hypertext markup language) and wherein a user of said client digital processing system does not need to create or convert said collection of digital images into said HTML format.

5. A method as in claim 4 wherein said collection is an album of digital images, said album having a layout and a style specified by a user of said client digital processing system.

6. A method as in claim 5 wherein said network is one of an Internet or an intranet.

7. A method as in claim 5 wherein said plurality of viewable images is not persistently maintained at said server digital processing system.

8. A method as in claim 7 wherein each of said plurality of images includes at least one digital picture, and wherein each of said at least one digital picture is persistently maintained at said server digital processing system.

9. A method as in claim 8 wherein said server digital processing system generates one of said viewable images and retrieves from storage at least one of said digital picture when it receives a web browsing request from one of said other client digital processing systems, and wherein after said other client digital processing system stops viewing said one of said viewable images, said one of said viewable images is not retained at said server digital processing system.

10. A method as in claim 8 wherein each of said at least one digital picture is generated and stored at said server digital processing system prior to any browsing request, from said other client digital processing systems, to view any one of said each of said at least one digital picture.

11. A method as in claim 2 wherein a user of said client digital processing, after having created said collection of digital images, causes said collection to be published by a simple selection.

12. A method as in claim 11 wherein said simple selection comprises one of a single selection using a pointing device coupled to said client digital processing system or two selections using said pointing device or three selections using said pointing device.

13. A method as in claim 2 wherein a user of said client digital processing systems may be an unrestricted public member.

14. A method of claim 5 wherein each of said plurality of viewable images is capable of being viewed by using a web browser at one of said other client digital processing systems to request an HTML page which displays a page of said album.

15. A method of claim 2 wherein said client digital processing system stores a copy of each of said digital images on a client file storage device which is managed by a client file management system and said client digital processing system stores in a client database a first representation and a second representation of said copy of each of said digital images and stores in said database an association to said copy of each of said digital images.

16. A method as in claim 15 wherein said first representation comprises a lower resolution version of said copy and said second representation comprises a digest of contents of said copy and said association comprises a reference to said copy.

17. A method as in claim 2 wherein said server digital processing system stores a copy of each of said digital images on a server file storage device which is managed by a server file management system and said server digital processing system stores in a server database a first representation and a second representation of said copy of each of said digital images and stores in said database an association to said copy of each of said digital images.

18. A method as in claim 17 wherein said first representation is an HTML viewable version of said copy and said second representation comprises a digest of contents of said copy and said association comprises a reference to said copy in said server file storage device.

19. A distributed computer readable storage medium containing executable computer program instructions which when executed cause a client digital processing system and a server digital processing system to perform a method comprising:

generating a collection of digital media at a client digital processing system;

transmitting collection information, which describes said collection of digital media, from said client digital processing system to said server digital processing system;

pregenerating automatically from said collection information a plurality of presentable media each of which is capable of being presented to other client digital processing systems which are coupled to a network which is operating according to an HTTP (hypertext transfer protocol) protocol.

20. A distributed computer readable storage medium as in claim 19 wherein said digital media comprises digital images and wherein said presentable media comprises viewable images and wherein said client digital processing system and said server digital processing system are each programmed to interact together such that said server digital processing system generates automatically, from said collection information, said plurality of viewable images.

21. A distributed computer readable storage medium as in claim 20, wherein said method further comprises:

transmitting, from said server digital processing system, said plurality of viewable images to a World Wide Web (WWW) server digital processing system;

transmitting said plurality of viewable images from said WWW server digital processing system to at least one of said other client digital processing systems, wherein said WWW server digital processing system is coupled to said network and wherein said client digital processing system is coupled to said network and transmits said collection information to said server digital processing system using said HTTP protocol.

22. A distributed computer readable storage medium as in claim 20 wherein each of said plurality of viewable images is in an HTML (hypertext markup language) and wherein a user of said client digital processing system does not need to create or convert said collection of digital images into said HTML format.

23. A distributed computer readable storage medium as in claim 22 wherein said collection is an album of digital images, said album having a layout and a style specified by a user of said client digital processing system.

24. A distributed computer readable storage medium as in claim 23 wherein said network is one of an Internet or an intranet.

25. A distributed computer readable storage medium as in claim 23 wherein said plurality of viewable images is not persistently maintained at said server digital processing system.

26. A distributed computer readable storage medium as in claim 25 wherein each of said plurality of images includes at least one digital picture, and wherein each of said at least one digital picture is persistently maintained at said server digital processing system.

27. A distributed computer readable storage medium as in claim 26 wherein said server digital processing system generates one of said viewable images and retrieves from storage at least one of said digital picture when it receives a web browsing request from one of said other client digital processing systems, and wherein after said other client digital processing system stops viewing said one of said viewable images, said one of said viewable images is not retained at said server digital processing system.

28. A distributed computer readable storage medium as in claim 26 wherein each of said at least one digital picture is generated and stored at said server digital processing system prior to any browsing request, from said other client digital processing systems, to view any one of said each of said at least one digital picture.

29. A distributed computer readable storage medium as in claim 20 wherein a user of said client digital processing, after having created said collection of digital images, causes said collection to be published by a simple selection.

30. A distributed computer readable storage medium as in claim 29 wherein said simple selection comprises one of a single selection using a pointing device coupled to said client digital processing system or two selections using said pointing device or three selections using said pointing device.

31. A distributed computer readable storage medium as in claim 20 wherein a user of said client digital processing systems may be an unrestricted public member.

32. A distributed computer readable storage medium of claim 23 wherein each of said plurality of viewable images is capable of being viewed by using a web browser at one of said other client digital processing systems to request an HTML page which displays a page of said album.

33. A distributed computer readable storage medium of claim 20 wherein said client digital processing system stores a copy of each of said digital images on a client file storage device which is managed by a client file management system and said client digital processing system stores in a client database a first representation and a second representation of said copy of each of said digital images and stores in said database an association to said copy of each of said digital images.

34. A distributed computer readable storage medium as in claim 33 wherein said first representation comprises a lower resolution version of said copy and said second representation comprises a digest of contents of said copy and said association comprises a reference to said copy.

35. A distributed computer readable storage medium as in claim 20 wherein said server digital processing system stores a copy of each of said digital images on a server file storage device which is managed by a server file management system and said server digital processing system stores in a server database a first representation and a second representation of said copy of each of said digital images and stores in said database an association to said copy of each of said digital images.

36. A server digital processing system for publishing, on a network operating according to an HTTP protocol, a collection of digital media, said server digital processing system comprising:

a processor;

a network interface coupled to said network and coupled to said processor, said network interface receiving collection information which describes a collection of digital media from a remotely located client digital processing system;

a file storage device coupled to said processor, said file storage device storing copies of said digital media under control of a file management system, and wherein said processor pregenerates automatically from said collection information a plurality of presentable media each of which is capable of being presented by other remotely located client digital processing systems which are coupled to said network.

37. A server digital processing system as in claim 36 wherein said digital media comprises digital images and wherein said presentable media comprises viewable images and wherein said processor maintains a database and creates web-viewable versions of each of said plurality of viewable images, and wherein said database comprises for each of said web-viewable versions an association between said each of said web-viewable versions and said corresponding copy of said digital image.

38. A computer readable storage medium containing executable computer program instructions which when executed cause a client digital processing system and a server digital processing system to perform a method comprising:

generating a collection of digital media at a client digital processing system;

transmitting collection information, which describes said collection of digital media, from said client digital processing system to said server digital processing system;

pregenerating automatically from said collection information a plurality of presentable media each of which is capable of being presented to other client digital processing systems which are coupled to a network which is operating according to an HTTP (hypertext transfer protocol) protocol.

* * * * *